US010424832B2

(12) United States Patent
Ramaci

(10) Patent No.: US 10,424,832 B2
(45) Date of Patent: Sep. 24, 2019

(54) WEARABLE DEVICE ANTENNA APPARATUS AND SYSTEM

(71) Applicant: Elements of Genius, Inc., Mt. Pleasant, SC (US)

(72) Inventor: Jonathan E. Ramaci, Mt. Pleasant, SC (US)

(73) Assignee: Elements of Genius, Inc., Mt. Pleasant, SC (US)

( * ) Notice: Subject to any disclaimer, the term of this patent is extended or adjusted under 35 U.S.C. 154(b) by 0 days.

(21) Appl. No.: 16/164,538

(22) Filed: Oct. 18, 2018

(65) Prior Publication Data
US 2019/0123429 A1 Apr. 25, 2019

Related U.S. Application Data

(60) Provisional application No. 62/575,847, filed on Oct. 23, 2017, provisional application No. 62/574,975, filed on Oct. 20, 2017.

(51) Int. Cl.
*H01Q 1/27* (2006.01)
*G01S 19/36* (2010.01)
(Continued)

(52) U.S. Cl.
CPC .............. *H01Q 1/273* (2013.01); *G01S 19/14* (2013.01); *G01S 19/36* (2013.01); *H01Q 21/30* (2013.01); *H01Q 1/241* (2013.01); *H01Q 9/0421* (2013.01)

(58) Field of Classification Search
CPC .......... G01S 19/36; G01S 19/34; G01S 19/35; G01S 19/37; G01S 5/0036; H01Q 1/273
(Continued)

(56) References Cited

U.S. PATENT DOCUMENTS

| 6,549,791 | B1 | 4/2003 | Jeon et al. |
| 2011/0128198 | A1 | 6/2011 | Sabban |

(Continued)

FOREIGN PATENT DOCUMENTS

| CN | 103488076 A | 1/2014 |
| CN | 206742488 U | 12/2017 |
| CN | 207082629 U | 3/2018 |

OTHER PUBLICATIONS

Faria, João Vicente. "Flexible Antennas Design and Test for Human Body Applications Scenarios." Master's Thesis. Técnico Lisboa. May 15, 2015. Accessed online Jan. 31, 2019 at https://fenix.tecnico.ulisboa.pt/downloadFile/281870113702325/Dissertacao.pdf.

(Continued)

*Primary Examiner* — Harry K Liu
(74) *Attorney, Agent, or Firm* — Gregory Finch; Finch Paolino, LLC

(57) ABSTRACT

A wearable wireless communication device incorporating one or more 3D-antennas into a housing frame of the device using Laser Directed Structuring (LDS). The device dimensions are chosen as to position the antennas at optimum separation distance to limit the amount of SAR exposure to the user. One or more antennas operate in conjunction with a metal ground plane extension element of the wearable device. The metal ground plane extension is conductively coupled to a flexible printed circuit board (FPCB) ground plane of the wireless communication device. The ground plane extension element together with the ground plane provided by the FPCB effectively increases the equivalent resonant length thereof, to excite one or more resonant modes of an antenna incorporated in the device housing frame, expanding the operation bandwidth of the communication device. One or more Matching Network is used to tune the impedances of the antennas.

20 Claims, 18 Drawing Sheets

(51) Int. Cl.
*G01S 19/14* (2010.01)
*H01Q 21/30* (2006.01)
*H01Q 1/24* (2006.01)
*H01Q 9/04* (2006.01)

(58) Field of Classification Search
USPC .................................................. 342/357.76
See application file for complete search history.

(56) References Cited

U.S. PATENT DOCUMENTS

| | | |
|---|---|---|
| 2011/0164371 A1 | 7/2011 | McClure et al. |
| 2012/0230377 A1 | 9/2012 | Jenwatanavet et al. |
| 2013/0181873 A1 | 7/2013 | Gutschenritter et al. |
| 2014/0002321 A1 | 1/2014 | Castany et al. |
| 2015/0045089 A1 | 2/2015 | He |
| 2015/0364820 A1* | 12/2015 | Dong ........................ H01Q 5/10 343/729 |
| 2016/0164179 A1* | 6/2016 | Margon .................. H01Q 1/242 343/843 |
| 2016/0218419 A1* | 7/2016 | Vance ..................... H01Q 1/241 |
| 2018/0004247 A1* | 1/2018 | Liu ......................... H01Q 13/10 |
| 2018/0083342 A1* | 3/2018 | Lepe ....................... H01Q 1/243 |
| 2019/0069788 A1* | 3/2019 | Coleman .............. A61B 5/6833 |

OTHER PUBLICATIONS

Written Opinion of the International Searching Authority, International application No. PCT/US18/56571. dated Jan. 3, 2019. ISA/US, Alexandria, VA.
International Search Report, International application No. PCT/US18/56571. dated Jan. 3, 2019. ISA/US, Alexandria, VA.

* cited by examiner

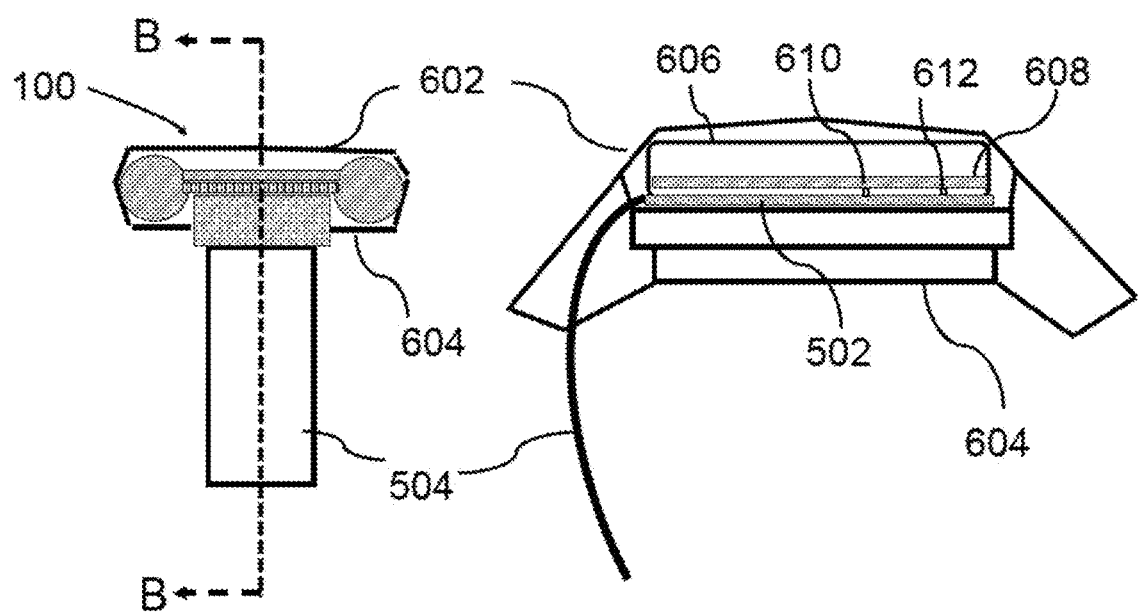

WEARABLE DEVICE ANTENNA APPARATUS AND SYSTEM

CROSS-REFERENCE TO RELATED APPLICATIONS

This application claims the benefit of U.S. Provisional Application 62/574,975, entitled "WEARABLE DEVICE ANTENNAS," filed Oct. 20, 2017 and hereby incorporated by reference in its entirety; and, U.S. Provisional Application 62/575,847, entitled "MULTIFUNCTION WEARABLE DEVICE WITH BROADBAND ANTENNAS," filed Oct. 23, 2017 and hereby incorporated by reference in its entirety.

FIELD

The present invention relates to the field of wireless communications and, more specifically, to antennas for wearable wireless communication devices.

BACKGROUND

Wearable communication technology has resulted in a growing demand for compact and miniature antennas. Some wireless smart communication devices (e.g., wearables, smartwatches, etc.) may be worn on the wrist or near a human body. The term "smart" arises because some of these devices (i.e., smartwatch) can be connected to the Internet. They can synchronize information with smart phones or tablet PCs. Conventional smartwatches operate generally in the frequency bands of Bluetooth® (BT), Wi-Fi®, and Global Positioning System (GPS).

To become independent of smart phones, the next generation of smartwatches or advanced wearable wireless devices, require operations over additional frequency bands such as Global System for Mobile Communication (GSM), Third Generation (3G), Fourth Generation (4G), and the future Fifth Generation (5G). This sets new challenges for small antenna designs and the demand of the increased in bandwidth (BW) requirements.

Fourth Generation (4G) was developed to meet the demand for higher data and was introduced using the LTE-A (Long-Term Evolution Advanced) standard which targets to support as high as 100 Mbps data rate for high mobility and up to 1 Gbps data rate for end-users. The specifications require the mobile terminal antenna to operate within the 700-960 MHz and 1700-2700 MHz frequency bands. The biggest challenge is to cover a relatively large bandwidth of 30% in the 700-960 MHz (i.e., Low-Band (LB)) since the physical space reserved for the antenna in a typical mobile terminal is electrically small compared to the free space wavelength at 700 MHz. Mobile antennas are now required to provide multi-band operation while dealing with the constraints including physical limitations and limited volumetric space for integration with other device components. A low profile and low weight design is preferable to ensure slim multi-functional platforms. The most common antenna designs for mobile devices are internal antennas such as patch/PIFAs (planar inverted F Antenna) and monopoles. Nevertheless, they are constrained by the fundamental limits of small antennas that imply an inherently narrow BW. There is a minimum achievable Q (quality factor), and thus a maximum BW for a given volume assigned to the antenna. For PIFAs, several well-known techniques are used to provide dual-band or multi-band operation such as inserting slits in the radiating path or using slotted ground planes. These approaches increase the complexity of the design and make it difficult for integration in slim platforms. The antenna must also be arranged at a certain height with respect to the ground plane occupying a considerable volume to guarantee good performance.

The focus of antenna designs has been on their geometry. The antenna is typically a self-resonant element that provides an efficient radiation pattern independent from the ground plane structure. However, the relevance of the ground plane in the radiation process has been underestimated and is progressively acquiring relevance since studies have demonstrated its strong contribution to the radiation properties of antennas. Several approaches have been proposed to incorporate the use of the ground plan for increasing BW for multi-band operation. These include the use of Coupling Elements (CEs), with various configurations, to capacitively excite the currents on the ground plane of the Printed Circuit Board (PCB), exploiting the low-quality factor of the wide ground plane, to achieve the LB requirements. The antenna impedance is then tuned to cover the desired frequency bands (e.g., LB and or HB) with the use of one or more Matching Network (MN). However, dual-band operation is challenging to obtain, requiring complicated design of the MNs, using large number of device components (e.g., surface mount devices) in a limited amount of space, increasing losses due to the internal resistances, increasing cost of the antenna, and higher power requirements. The size of the batteries is constrained by the total size of the device and becomes an issue for miniaturization.

Another important aspect of the design of antennas is the surrounding operating environment of the antenna. The effect of the proximity of the antenna to the human appendages (e.g., arm, wrist) is therefore an important parameter. Antennas may have performance degradation when in contact with or in proximity to the body which is a lossy dielectric medium. The small size of the antenna in proximity to the human body greatly reduces the radiation range. Some antenna designs, incorporated within the body-worn device or within the wrist band, may result in an undesirable amount of body absorption, high specific absorption rate (SAR), shift in resonant frequency (i.e., detuning), altered radiation pattern, decrease in radiation efficiency, and return loss of electromagnetic signals.

Therefore, the expectations for advanced wearable wireless communication devices present considerable product development challenges in the selection, design, and incorporation of antennas, including power management. The antennas must be designed with specific requirements to ensure suitability, proper function, and simultaneously meet several performance criteria. They must be compact, low-profile, omnidirectional, in some cases highly directive, low specific absorption rate (SAR), easy to manufacture, low lost, and multiband operational. Lightweight designs for improved comfort are also demanded for those designs to be worn particularly around the wrist, which is the most convenient location. Moreover, computing units, sensors, battery cells and related electronic parts are integrated in those devices. These impose a challenge due to a very limited space allowed in the wrist-worn device for the embedded antenna. However, such a design may be constrained by, for example, a small ground plane, limited volumetric space, thus limiting the ability of wearable to meet functional and operational requirements, especially for multi-band operation.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Applicant has perceived a need for a device and system that not only overcomes the drawbacks associated with aforementioned challenges in the selection, design, development, power management, and incorporation of antennas into advanced wearable wireless communication devices present. Overcoming these drawbacks, and other benefits, are attendant to a wearable wireless communication device and antennas disclosed herein.

In an aspect of the present disclosure, a wearable wireless communication device comprises one or more microprocessor, microcontroller, micro GSM/GPRS chipset, micro Subscriber Identity Module (SIM), read-write memory device, read-only memory device (ROM), random access memory (RAM), flash memory, memory storage device, memory I-O, I-O devices, buttons, display, LED, user interface, rechargeable battery, microphone, speaker, wireless transceiver (e.g., RF, Wi-Fi®, Bluetooth®, IoT), RF electronic circuits and components, universal asynchronous receiver-transmitter (UART), Wi-Fi® electronic circuits and components, Bluetooth® electronic circuits and components, transceivers (e.g., RF, Wi-Fi®, Bluetooth®, IoT, etc.), audio CODEC, cellular antenna, GPS antenna, Wi-Fi® antenna, Bluetooth® antenna, IoT antenna, accelerometer, vibrating motor (output), preferably configured in combination, to function as a compact, low-profile, wearable electronic device. In some implementations, the hardware components are populated on a printed circuit board (PCB) and or a flexible printed circuit board member, preferably contained in a housing, said housing receivable in a frame of a wristband, enabling attachment to a user with one or more straps connected to the wristband frame.

In another aspect of the present disclosure, the wireless communication device is configured as a compact low profile wearable device operating as a multi-function, multiband operation device providing voice, data, SMS, location functions, and access to cloud computing. In an embodiment, the device is configured to function as a wearable interactive notification device for the management of medication adherence. The wearable notification device provides visual reminders, at a display panel, of one or more medication events determined from a medication schedule applicable to the user.

In another aspect of the present disclosure, a wearable wireless communication device comprises one or more three-dimensional (3D)-antennas incorporated into a frame of the housing of the device using Laser Directed Structuring (LDS).

In another aspect of the present disclosure, the device dimensions are chosen as to position the antennas at optimum locations and distances from the surface of a user's appendage to limit the amount of high specific absorption rate (SAR) exposure to the user.

In another aspect of the present disclosure, the antennas are placed at one or more specified zones relative to one or more locations and distances at, within, or above the PCB and the ground plane of the PCB to achieve practicable operational performances.

In another aspect of the present disclosure, the antennas are shielded from the components of the PCB to minimize operational interferences. In an embodiment, the antennas are shielded by a non-conductive shielding layer positioned between the antennas and the PCB. In yet another aspect of the present disclosure, the antennas operate in conjunction with a printed circuit board (PCB) ground plane portion and a conductive ground plane extension element of the wearable wireless communication device.

In yet another aspect of the present disclosure, the metal ground plane extension is conductively coupled to a PCB ground plane portion of the wireless communication device. The ground plane extension element, together with the PCB ground plane portion, effectively increases the equivalent resonant length thereof, to excite one or more resonant modes of the antennas incorporated in the device housing frame, expanding the operation bandwidth of the communication device.

In yet another aspect of the present disclosure, one or more Matching Network is used to tune the impedances of the antennas.

Specific embodiments of the present disclosure provide for a wearable antenna system comprising a printed circuit board comprising one or more flexible members coupled to one or more edges of the printed circuit board, and a ground plane disposed on a surface of the printed circuit board; a cellular antenna operably engaged with the ground plane; a global navigation satellite system antenna operably engaged with the ground plane; and, a ground plane extension operably engaged with the ground plane and coupled to an edge surface of the printed circuit board, the ground plane extension being operably engaged with the cellular antenna and the global navigation satellite system antenna via the ground plane, the ground plane extension comprising a flexible conductive material having dimensions in the range of about five to 15 millimeters in width, about 50 to 100 millimeters in length, and about 0.2 to 0.5 millimeters in thickness.

Further specific embodiments of the present disclosure provide for wearable wireless communication device comprising a housing comprising an upper frame and a lower frame, the upper frame and the lower frame being mateably coupled, the upper frame and the lower frame each comprising side walls, an inner surface, and an outer surface, the inner surface of the upper frame and the inner surface of the lower frame defining an interior portion of the housing; a flexible strap coupled to the housing, the flexible strap comprising an upper strap portion and a lower strap portion, the upper strap portion and the lower strap portion being coupled together to define the flexible strap; a printed circuit board being disposed in the interior portion of the housing, the printed circuit board comprising one or more flexible members coupled to one or more edges of the printed circuit board, and a ground plane disposed on a surface of the printed circuit board; a cellular antenna operably engaged with the ground plane, the cellular antenna being disposed on an interior surface of the housing; a global navigation satellite system antenna operably engaged with the ground plane, the global navigation satellite system antenna being disposed on an interior surface of the housing; and, a ground plane extension operably engaged with the ground plane and coupled to an edge surface of the printed circuit board, the ground plane extension being operably engaged with the cellular antenna and the global navigation satellite system antenna via the ground plane, the ground plane extension comprising a flexible conductive material having dimensions in the range of about five to 15 millimeters in width, about 50 to 100 millimeters in length, and about 0.2 to 0.5 millimeters in thickness, the ground plane extension being encapsulated in the flexible strap between the upper strap portion and the lower strap portion.

Still further specific embodiments of the present disclosure provide for a wearable wireless communications system comprising a housing comprising an upper frame and a lower frame, the upper frame and the lower frame being mateably coupled, the upper frame and the lower frame each comprising side walls, an inner surface, and an outer surface, the inner surface of the upper frame and the inner surface of the lower frame defining an interior portion of the housing; a flexible strap coupled to the housing, the flexible strap comprising an upper strap portion and a lower strap portion, the upper strap portion and the lower strap portion being coupled together to define the flexible strap; a printed circuit board being disposed in the interior portion of the housing, the printed circuit board comprising one or more flexible members coupled to one or more edges of the printed circuit board, and a ground plane disposed on a surface of the printed circuit board; a cellular antenna operably engaged with the ground plane, the cellular antenna being disposed on an interior surface of the housing; a global navigation satellite system antenna operably engaged with the ground plane, the global navigation satellite system antenna being disposed on an interior surface of the housing; a ground plane extension operably engaged with the ground plane and coupled to an edge surface of the printed circuit board, the ground plane extension being operably engaged with the cellular antenna and the global navigation satellite system antenna via the ground plane, the ground plane extension comprising a flexible conductive material having dimensions in the range of about five to 15 millimeters in width, about 50 to 100 millimeters in length, and about 0.2 to 0.5 millimeters in thickness, the ground plane extension being encapsulated in the flexible strap between the upper strap portion and the lower strap portion; and, at least one matching network disposed on the printed circuit board and operably engaged with the cellular antenna and the global navigation satellite system antenna.

The characteristics of the antennas of the present invention were modeled, measured, evaluated and the performances disclosed herein demonstrate that the device has overcome certain drawbacks associated with aforementioned challenges in the selection, design, development, power management, and incorporation of antennas into advanced wearable wireless communication devices.

Various implementations described in the present disclosure can comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations can be realized and obtained by means of the systems, methods, and features particularly pointed out in the appended claims. These and other features will become more fully apparent from the following description and appended claims or can be learned by the practice of such exemplary implementations as set forth hereinafter.

BRIEF DESCRIPTION OF THE DRAWINGS

The accompanying drawings are included to provide a further understanding of the invention and are incorporated in and constitute a part of this specification. The drawings illustrate exemplary embodiments of the invention and, together with the description, explain the principles of the invention. The above and other objects, features and advantages of the present disclosure will be more apparent from the following detailed description taken in conjunction with the accompanying drawings, in which:

FIG. 6A is a side view illustration of a housing with top and bottom frames of a wearable wireless communication device constructed according to an aspect of the present disclosure;

FIG. 6B is a cross-section view illustration of a housing of a wearable wireless communication device constructed according to an aspect of the present disclosure;

DETAILED DESCRIPTION

Figure 1A:
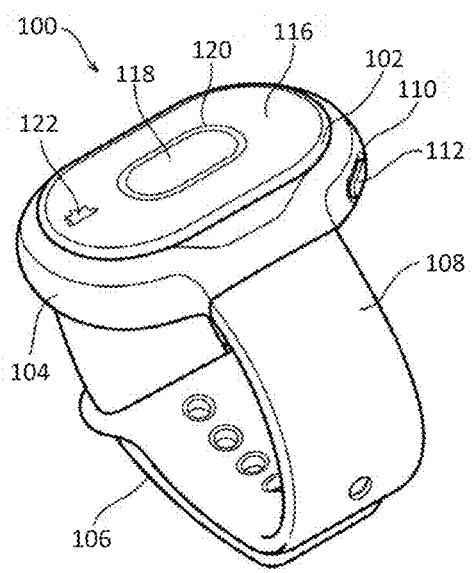
FIG. 1A is a perspective view of a wearable wireless communication device constructed according to an aspect of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements.

Unless otherwise defined, all terms (including technical and scientific terms) used herein have the same meaning as commonly understood by one of ordinary skill in the art to which these embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

The terminology used herein is for describing particular embodiments only and is not intended to be limiting the embodiments. As used herein, the singular forms "a," "an," and "the" are intended to include the plural forms and vice versa, unless explicitly stated or the context clearly indicates otherwise. The term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

It will be further understood that the terms "comprises," "comprising," "includes," and/or "including,", and variants thereof, when used herein, specify the presence of stated features, steps, operations, elements, and/or components, but do not preclude the presence or addition of one or more other features, steps, operations, elements, components, and/or groups thereof. It will be understood that when an element is referred to as being "coupled," "connected," or "responsive" to another element, it can be directly coupled, connected, or responsive to the other element, or intervening elements may also be present. In contrast, when an element is referred to as being "directly coupled," "directly connected," or "directly responsive" to another element, there are no intervening elements present. As used herein, the term "and/or" includes any and all combinations of one or more of the associated listed items.

It will be understood that the spatially relative terms are intended to encompass different orientations of the device in use or operation in addition to the orientation depicted in the figures. Spatially relative terms, such as "above," "below," "upper," "lower," "top, "bottom," "side," "horizontal," and/or "vertical" and the like, may be used herein for ease of description to describe one element or feature's relationship to another element(s) or feature(s) as illustrated in the figures. Unless stated otherwise, "top" describes that side of the system or component that is facing upward and "bottom" is that side of the system or component that is opposite or distal the top of the system or component and is facing downward. Unless stated otherwise, "side" describes that an end or direction of the system or component facing in horizontal direction. "Horizontal" or "horizontal orientation" describes that which is in a plane aligned with the horizon. Vertical" or "vertical orientation" describes that which is in a plane that is angled at 90 degrees to the horizontal. If the device in the figures is turned over, elements described as "below" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. Well-known functions or constructions may not be described in detail for brevity and/or clarity.

It will be understood that, although the terms "first," "second," etc. may be used herein to describe various elements, these elements should not be limited by these terms. These terms are only used to distinguish one element from another. Thus, a first element could be termed a second element without departing from the teachings of the present embodiments.

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or substantially," it will be understood that the particular value forms another aspect. It will be further understood that the endpoints of each of the ranges are significant both in relation to the other endpoint, and independently of the other endpoint.

For purposes of the present disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list.

Numerous alternative embodiments of a wearable wireless communication device and antennas incorporated to function within the apparatus are described herein. In general, the wearable wireless communication device comprises, but not limited to, a housing body, a plurality of internal electronic components (e.g., processor, memory device, transceiver, battery, etc.), a user interface (e.g., display panel, buttons), printed circuit board (PCB), flexible members, flexible PCB (FBCB), antennas, and a mechanism (e.g. wristband, strap, etc.) for attachment to a user's appendage (e.g., wrist). The electronic components are mounted on a PCB or FPCB. The said elements are preferably configured within or to form a compact low profile wearable device operating as a multi-function, multiband device; providing voice, data, SMS, location functions, and access to cloud computing services. In certain implementations, the wearable wireless communication device is configured to operate as a wearable interactive notification device for the management of medication adherence.

Figure 1B:
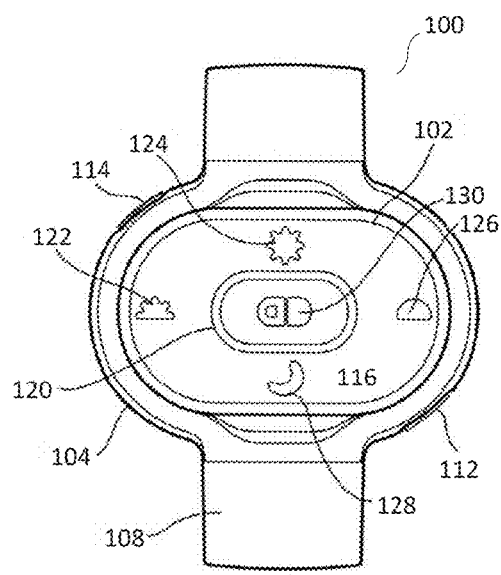
FIG. 1B is a top view of the wearable wireless communication device illustrated in FIG. 1A.

FIGS. 1A and 1B illustrate an exemplary wearable wireless communication device 100 according to an aspect of the present disclosure. In various aspects of the present disclosure, "wearable" means that the wireless communication device 100 can be temporarily attached to the body of a human being such that the human being can move (by either walking or undergoing motion with the assistance of a wheelchair or scooter) with the device 100 attached, without the wireless communication device 100 impeding the motion of the human being. In various aspects of the present disclosure, "wearable" more particularly means that the interactive notification device 100 can be temporarily attached to an appendage of a human being, such as an upper arm, without the aforementioned impeding of motion. In still other aspects of the present disclosure, "wearable" even more particularly means that the wearable wireless communication device 100 can be temporarily attached to a human being's wrist, without the aforementioned impeding of motion, such that a display is visible to the human being upon a downward glance toward the wrist on which the wearable wireless communication device 100 is worn. Although the specific embodiments are discussed later herein with reference to the wearable wireless communication device 100 temporarily attached about a wrist of a user, such an example of a temporary attachment to the user is for illustrative purposes only and is not meant to be limiting. According to one aspect of the present disclosure, wearable wireless communication device 100 is configured to operate as a multi-function, multiband device; providing voice, data, SMS, location functions, and access to cloud computing services. According to another aspect of the invention, the wearable wireless communication device 100 is configured to function as a wearable interactive notification device for medication management (hereinafter "the device 100"). Device 100 comprises a housing 102 received in a wristband frame 104 of wristband 106. Housing 102 contains a plurality of elements including a PCB and flexible members (e.g., FPCB) on which hardware elements are mounted (see FIGS. 3, 4, and 5). In some implementations, the housing 102 can be removable from the wristband frame 104. A wristband strap 108 is joined to sides of the wristband frame 104 by any suitable means. An aperture 110 can be formed into the wristband frame 104 to accommodate a first side button 112. An identically-constructed second side button 114 can be provided in another aperture formed in the wristband frame 104 opposite the aperture 110, as exemplified in FIG. 1B. Side buttons 112,114 are referred to herein as auxiliary buttons whereby their actuations open a communication channel, preferably between device 100 and a medication management system and or emergency alert services. The housing includes a user interface display panel 116 with a central portion 118, about which a backlit oval-shaped light-emitting diode (LED) ring 120 may be positioned. The display panel 116 is constructed of material rigid enough to maintain a flat profile when not pressed, yet sufficiently flexible such that a user can actuate by pressing downwardly on that central portion 118, whereby during a medication management event, can also open a communication channel. The display panel 116 can also display one or more LED-backlit icons, such as a morning icon 122, afternoon icon 124, evening icon 126, and night icon 128. Finally, as shown in FIG. 1B, the display panel 116 can also display a medication icon 130, which can be pill-shaped as shown, at the central portion 118. When activated (i.e., lit), these icons serve to remind a user of device 100 to take a medication (e.g., a pill) scheduled accordingly, within a specified time-frame.

Figure 2:
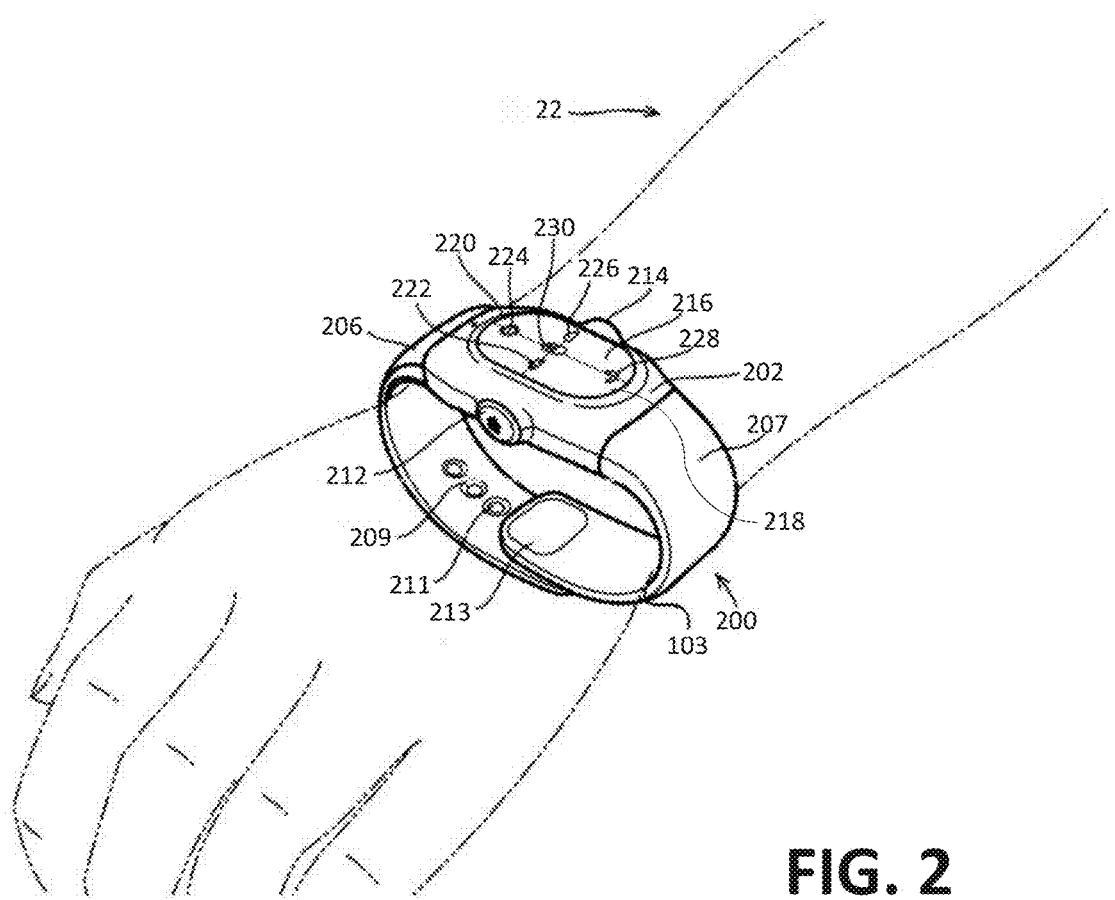
FIG. 2 is a perspective view of a wearable wireless device constructed according to another aspect of the present disclosure.

FIG. 2 is a perspective view of a wearable wireless communication device 200 constructed according to another aspect of the present disclosure. Wearable wireless communication device 200, shown being worn on a wrist 103 of a user 22, includes a housing portion 202 that, like housing 102 (FIGS. 1A and 1B), contains a plurality of elements including a PCB and flexible members on which various hardware elements are mounted. A first wristband strap segment 206 is joined to one side of the housing portion 202 by any suitable means, and the first wristband strap segment 206 may have a plurality of apertures 209 formed therein to expose magnetizable areas 211, formed by embedding a strip of magnetizable material within the first wristband strap segment 206. A second wristband strap segment 207 can be joined to an opposed side of the housing portion, also by any suitable means. The second wristband strap segment can be provided with a pad 213 bearing a magnetic peg (not shown) that will be attracted to any of the magnetizable areas 211, thus providing a means of custom-fitting the wearable interactive notification device 200 to a wrist of a wearer. The housing portion 202 can accommodate a first side button 212 and an opposed second side button 214, with side buttons 212,214 having the same purpose and functions as those disclosed for side buttons 112,114 (FIGS. 1A and 1B). The housing portion 202 includes a display panel 216 with a central portion (located at medication icon 230), about which a backlit oval-shaped light-emitting diode (LED) ring 220 may be positioned. The display panel 216 is constructed of material rigid enough to maintain a flat profile when not pressed, yet sufficiently flexible such that a user can actuate by pressing downwardly on that central portion 216. That upper button would be actuated for the same purposes as discussed above with regard to FIGS. 1A and 1B. The display panel 216 can also display one or more LED-backlit icons, such as a morning icon 222, afternoon icon 224, evening icon 226, and night icon 228. Finally, as shown similarly in FIG. 2, the display panel 216 can also display a medication icon 230, which can be pill-shaped as shown, at the central portion 218. When activated (i.e., lit), these icons serve to remind a user of the device 200 to take a medication scheduled accordingly, within a specified time-frame.

Figure 3A:
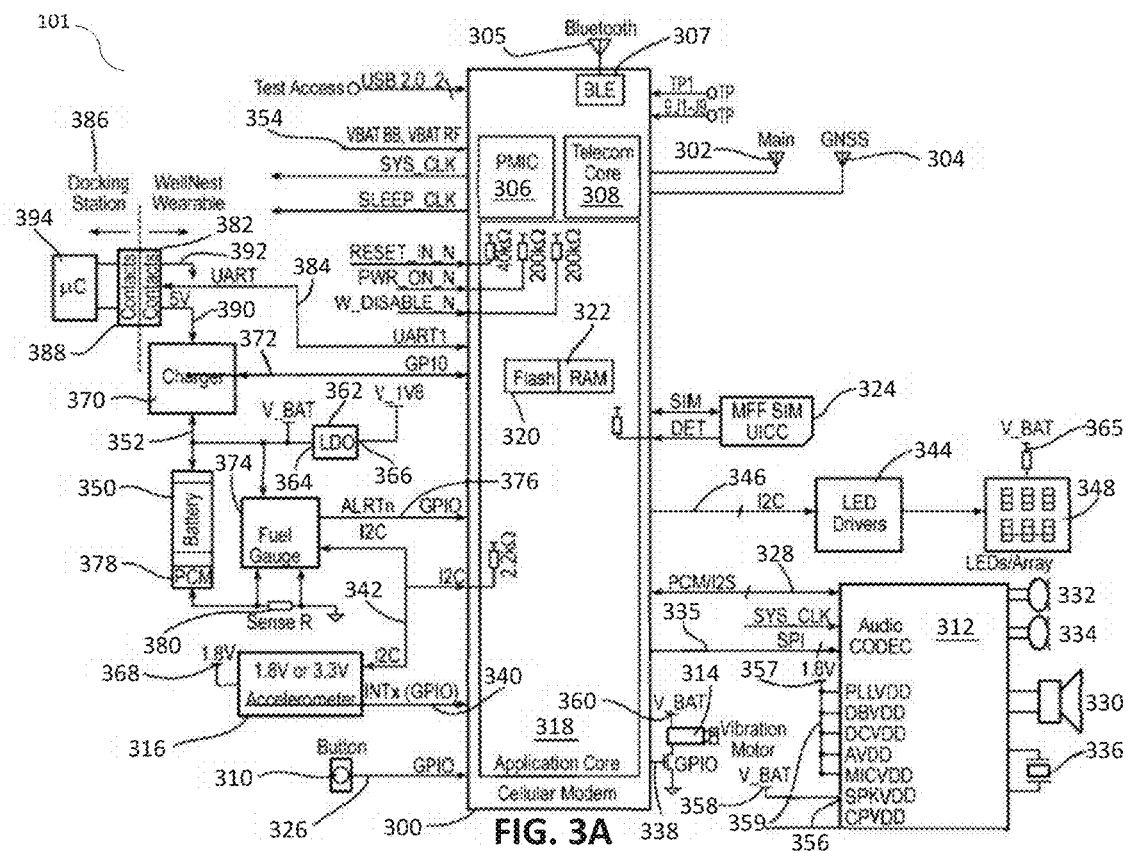
FIG. 3A is a schematic block diagram of exemplary interconnected hardware components of a wearable wireless communication device according to an aspect of the present disclosure.

FIG. 3A is a schematic block diagram of exemplary interconnected hardware components of the device 101. A cellular modem 300 is configured to wirelessly communicate over a communication network (e.g., cellular network, local area network, wide area network, Internet, cloud, etc.) via a main, radio frequency ("RF") antenna 302 in communication with the cellular modem 300 via an RF module (not shown). In an implementation, RF main antenna 302 complies with both 3G and 4G Long-Term Evolution (LTE) wireless communication standards. A Global Navigation Satellite System (GNSS) antenna 304, also in communication with the cellular modem 300 via a GPS module (not shown), allows the cellular modem 300 to communicate with one or more satellite navigation systems, such as Global Positioning System (GPS) for the United States, Galileo for Europe, GLONASS for Russia, and BeiDou for China. In various implementations, the cellular modem 300 can support all of the foregoing satellite navigation systems. The cellular modem 300 may be modified to comply with future improvements and or advancements of all foregoing satellite navigation systems. The wearable wireless communication device can also include a Bluetooth® antenna 305 in communication with a Bluetooth® module, such as a Bluetooth® Low Energy ("BLE") module 307. Although BLE module 307 is shown for ease of illustration in FIG. 3A, as being inside the boundaries defining the cellular modem 300, it should be understood that the BLE module 307 can be a chip separate from the cellular modem 300. The Bluetooth® antenna 305 would allow the wearable communication device to, at a lower power requirement than that used for connecting with remote wireless devices, communicate with other Bluetooth enabled peripheral devices in the vicinity of the device 100. In various implementations, cellular modem 300 can be commercially available under Model No. WP7603-1, manufactured by Sierra Wireless of Richmond, British Columbia, Canada. Under a present implementation, such a cellular modem 300 includes a power management integrated circuit (PMIC) 306, which controls the flow and direction of electrical power in the cellular modem 300. Such a cellular modem 300 also presently includes a core chipset manufactured by Qualcomm, Inc. (San Diego, Calif.) under Model No. MDM9207, which contains a microprocessor (referred to herein as "processor") 308.

The processor 308 preferably performs several functions, including managing the cellular modem 300, managing power in the device 100, supporting services, for example, voice control cloud computing services, detecting buttons such as buttons 112,114, managing audio communications both directly or indirectly through an audio coder-decoder (CODEC) 312, driving a vibration motor 314, and managing an accelerometer 316. It shall be understood that the present disclosure is not limited to the onboard processor shown in FIG. 3A, and that other implementations can use a processor separate from the cellular modem 300. As used herein, for a processor to "communicate with the modem" means that the processor can be either part of the modem, or separate from the modem, so long as data is communicated between the processor and the modem. Also, the foregoing terms "directly" and "indirectly" reflect that the device 100 implements more than one audio functions beyond the standard management of cellular phone calls done solely by the cellular modem 300 or, for example, the management and processing of voice-based commands from a user 22 accessing remote voice recognition cloud computing software and services, residing in a remote cloud server. These software and services include, but not limited to, Alexa® software and services from Amazon of Seattle, Wash., CORTANA® software and services from Microsoft Corporation of Redmond, Wash., the GOOGLE NOW® software and services from Google Inc. of Mountain View, Calif., and the SIRI® software and services from Apple Inc. of Cupertino, Calif.

The said cloud server and services are commonly referred to as "cloud computing", "on-demand computing", "software as a service (SaaS)", "platform computing", "network-accessible platform", "cloud services", "data centers," and the like. The term "cloud" can include a collection of hardware and software that forms a shared pool of configurable computing resources (e.g., networks, servers, storage, applications, services, etc.), which can be suitably provisioned to provide on-demand self-service, network access, resource pooling, elasticity and measured service, among other features. Cloud may be deployed as a private cloud (e.g., infrastructure operated by a single enterprise/organization), community cloud (e.g., infrastructure shared by several organizations to support a specific community that has shared concerns), public cloud (e.g., infrastructure made available to the public, such as the Internet), or a suitable combination of two or more disparate types of clouds. In this description, "cloud computing" is defined as a model for enabling on-demand network access to a shared pool of configurable computing resources (e.g., networks, servers, storage, applications, and services). Generally, a cloud computing model enables some of those responsibilities which previously may have been provided by an organization's own information technology department, to instead be delivered as service layers within a cloud environment, for use by consumers (either within or external to the organization, according to the cloud's public/private nature). A cloud computing model can take the form of various service models such as, for example, Software as a Service ("SaaS") in which consumers use software applications that are running upon a cloud infrastructure, while a SaaS provider manages or controls the underlying cloud infrastructure and applications; and, Platform as a Service ("PaaS") in which consumers can use software programming languages and development tools supported by a PaaS provider to develop, deploy, and otherwise control their own applications, while the PaaS provider manages or controls other aspects of the cloud environment (i.e., everything below the run-time execution environment). The definition of "cloud computing" is not limited to any of the other numerous advantages that can be obtained from such models when properly deployed.

Also, as shown in block form in FIG. 3A, the cellular modem 300 includes an application core 318 having a flash memory 320 and Random-Access Memory (RAM) 322. The RAM 322 is volatile memory and thus only temporarily stores data as needed during operation of the device 100. Flash memory 320 can store not only the software applications, but also, for example, voice messages or audio files (e.g., .wav, .aff, .au, MP3, MPEG-). Storing messages locally on flash memory 320 for play-back is preferable for power conservation and management purposes. The flash memory 320 can also store executable instructions for the processor 308.

As shown in FIG. 3A, a Subscriber Identity Module (SIM) card 324 communicates with the cellular modem 300 to manage network allocation and authentication, and functions as a switchboard for security and wireless access control connections to a remote database server. In various implementations, the SIM card 324 can be an "MFF"-type SIM card, which can operate between −40° and 212° F., and features corrosion-resistant contacts soldered into the circuit board, making it much more robust than plug-in SIMs. Furthermore, integration into electronics provides protection from theft.

Still referring to FIG. 3A, primary button 310, configured to be actuated in conjunction with a downward pressing of the central portion 118 of the device 101, communicates with the cellular modem 300 via an interface, such as a General-Purpose Input/Output (GPIO) interface 326. In various implementations, primary button 310 can be a momentary "on" switch. The primary button 310 is configured to generate one or more interrupt signals configured to cause the cellular modem 300 to transmit one or more communications to a database server, communications including but not limited to, user requests, confirmation of user compliance with a medication consumption scheduled event, or transmission of an emergency notification to a database server. Due to the GPS module communicating with the GNSS antenna 304, a contemporaneous geographic location of the device 100 can be included with the emergency notification. In an embodiment, an interrupt signal can be configured to cause the cellular modem 300 to place an Enhanced 9-1-1 (E911) emergency call, which provides emergency responders with information as to the location of a user/caller. In addition, the emergency condition can cause a red LED to illuminate an emergency icon on the device 100.

Again, referring to FIG. 3A, the audio CODEC 312 can communicate with the cellular modem 300 via both an Inter-integrated circuit Sound (I2S) interface 328 and an SPI interface 335. The I2S interface 328 provides two-way communication of audio signals between the cellular modem 300 and the audio CODEC 312, while the SPI interface 335 communicates control signals from the processor 308 to the audio CODEC 312, such as signals to temporarily and selectively disable peripheral devices communicating with the audio CODEC 312. An exemplary audio CODEC for performing functions according to aspects of the present disclosure can be Model No. WM8962B, commercially available from Cirrus Logic, Inc. (Austin, Tex.). The audio CODEC 312 can decode pulse-code modulated (PCM) digital audio signals from the modem 300 to analog signals and can also encode (convert) analog signals from connected microphones 332, 334 to digital (PCM) signals. Microphones 332,334 can be analog microphones. Two or more microphones may be incorporated to improve audio quality over a single microphone. The device 100 can further include an external crystal oscillator 336 communicating with the audio CODEC 312. The crystal oscillator 336 provides a clock function for the internal circuitry of the audio CODEC 312 and can operate at a frequency of, for example, 24 MHz.

The audio CODEC 312 is also configured to encode (convert, into digital form) voice commands from a user. The microphones 332,334 are configured to receive a voice command from a user, convert the voice command to a voice signal, and to send the voice signal to the audio CODEC 312. The audio CODEC 312 encodes the voice signal to produce an encoded voice signal and transmits the encoded voice signal to the cellular modem 300 via the I2S interface 328. The processor 308 can then transmit the encoded voice signal to, for example, voice recognition software and services, which through its translation engine translates the encoded voice signal into a text communication. The voice recognition cloud computing service can then send that text communication as a query to, for example, a database server, for processing. For instance, if the user verbally utters the question "Do I have any new messages?" into the microphones 332,334, the processor 308 transmits the encoded voice signal resulting from that utterance to the voice recognition service, that transmission is preceded by a header that contains a number uniquely identifying the particular device 100. For example, since the device 100 is a cellular device, the unique identification number can be the IMEI (International Mobile Equipment Identity) number of the device 100. The voice recognition cloud computing service can translate the payload portion of the communication from the device 100 into text, which the voice recognition service interprets as a command to poll, for example, a message table of a database residing in a remote database server, in the form of, for example, "Select a message from the message table, wherein user ID=XYZ [unique ID digits]." The database server then complies with the command by sending the requested information (e.g., received and stored text messages) to the voice recognition service, in text form. The voice recognition service can then convert the information from the text form into a response signal that carries, for example, a verbal response to a user's question.

Still referring to FIG. 3A, the cellular modem 300, via the RF main antenna 302, receives the response signal from a voice recognition cloud computing service in a format appropriate for the software platform used in the device 100. Examples of supported formats for the Legato® platform, comprise, but not are limited to, MPEG files, OGG, or a PCM Hypertext Transfer Protocol (HTTP) stream. Upon receipt of the response signal by the cellular modem 300, the processor 308 routes the response signal to the audio CODEC 312, which decodes the response signal to produce a decoded response signal and then sends the decoded response signal to the speaker 330, thereby allowing the user of device 100 to hear the response to his/her vocal command.

FIG. 3A shows the vibration motor 314 communicating with cellular modem 300 via a GPIO interface 338. The processor 308 may activate the vibration motor 314 on and off at scheduled times, as determined by directives from a database server, a directive, for example, instructing the device 100 to perform a specified function. As an example, a reminder notification from a database server can comprise a vibration directive, causing the device 100 to respond by turning the vibration motor 314 on from an off state, or turning the vibration motor 314 off from an on state. Thus, vibration alone can remind a user, for example, to take a given medication. In various implementations, the processor may synchronize activation of the vibration motor 314 so that it coincides with blinking light-emitting diodes (LEDs) on from an off state.

Alternatively, the processor 308 may turn the vibration motor 314 on from an off state and keep it in an on state for a predetermined duration, such as forty seconds, before returning the vibration motor 314 to an off state. Vibration motor 314 can comprise, in various implementations of the present disclosure, a coin-shaped vibration motor, such as that available from Precision Microdrives (London, United Kingdom) under Part No. 304-015, although other suitable motors can be used in other implementations.

Still referring to FIG. 3A, the accelerometer 316 can communicate with the cellular modem 300 via a GPIO interface 340 and also via an Inter-Integrated Circuit (I2C) Bus 342. The accelerometer 316 can be configured to detect, among other things, user motion, for example, a free-fall condition of the user, and responsive to detection of the user free-fall condition, send a first interrupt signal to the processor 308. In particular, the accelerometer 316 can include a motion detection algorithm, for example, a free-fall detection algorithm incorporated into its internal design. Using the GPIO interface 340, the accelerometer 316 can be configured to send an interrupt signal to the processor 308 upon detection of specified motions or of a free-fall condition. The flash memory 320 stores executable instructions for causing the processor 308 to, responsive to receipt of that interrupt signal, cause the cellular modem 300 to send a motion detection event or fall event communication to, for example, a database server. Furthermore, in various implementations, the accelerometer 316 can be configured to wake up the device 100 via the GPIO interface 340 upon motion detection (e.g., velocity, acceleration, rotation, etc.) or detection of a free-fall condition. As such, the processor 308 can remain in a low-power state until the accelerometer 316 sends the interrupt signal. In various implementations the accelerometer 316 is contained within the housing of the device 100 (such as housing 102 in FIGS. 1A and 1B), and the accelerometer 316 is further configured to send another interrupt signal to the processor 308 responsive to a single tap of the housing 102 by the device user. In some implementations of the notification device 100, the accelerometer 316 is optionally further configured to count the number of steps taken by the user.

Referring FIG. 3A, the device 100 is further provided with an LED driver group 344, each LED driver in the group 344 communicating with an interface such as an I2C bus 346 connected to the cellular modem 300, and each LED driver in the group 344 can be configured to have a different bus address. In various implementations, each LED driver in the LED driver group 344 can be commercially available as Model No. SX1509B, available from Semtech Corporation (Camarillo, Calif.). The LED driver group 344 also communicates with an LED array 348, which can be comprised of a plurality of red, green, and blue ("RGB") LEDs. The LED driver group 344 may be comprised of three LED drivers: one driver controlling the red LEDs, one driver controlling the green LEDs, and one driver controlling the blue LEDs. The LEDs in the LED array 348 may be used to illuminate various icons located on a display panel of the housing (such as housing 102 in FIGS. 1A and 1B). When activated (i.e., lit), these icons serve to remind a user of the device 100 to take a medication scheduled accordingly, within a specified time-frame.

Again referring to FIG. 3A, the wearable wireless communication device 100 (again abbreviated herein as "the device 100") can also include a battery 350 having an electrical connection (such as by a wire or by a via in a printed circuit board) to the cellular modem 300, as shown by the "V_BAT" output 352 and the "VBAT_BB, VBAT_RF" input 354 to the cellular modem 300. The battery 350 can similarly supply power to the speaker input pin "SPKVDD" 356 of the audio CODEC 312 at input 358 and to the vibration motor 314 at input 360. In various implementations, the battery 350 can be configured to support at least four days of standby operation and 24 hours of normal use and can have a capacity of 250 mAh. A Low Drop Out (LDO) regulator 362 regulates output voltage from the battery 350 to provide a lower voltage to certain peripheral devices in the device 100 than that supplied by the battery 350, and to provide a thermal shutdown and current limit to protect those peripheral devices. For instance, in the example of FIG. 3A, the LDO regulator 362 receives the electrical connection 352 from the battery 350 at an LDO input 364, which can receive a battery voltage of, for example, 3.3 V, and outputs at 366 a reduced voltage (which can be 1.8 V in some implementations, although this voltage is not limiting), which is provided at input 357 to simultaneously power a plurality of audio CODEC inputs (other than the "SPKVDD" 356 pin discussed above), and to power the accelerometer 316 at input 368. The audio CODEC 312 thus comprises a plurality of inputs sharing a common connection to a voltage bus 359 at a first voltage (here, the 1.8 V), and a speaker input 356 connected to a power source at a second voltage (here, the 3.3V). The processor 308 is configured to selectively disable at least one of the ports associated with the speaker 330 and the microphones 332, 334, responsive to a determination that the device 100 is in an idle state. Such selective disabling preserves battery power when the device 100 is inactive. A battery charger 370 electrically communicates with the battery 350 and communicates with the cellular modem 300 via an interface such as a GPIO interface 372. Additionally, a fuel gauge 374 can communicate with the cellular modem 300 (and thus with the processor 308) via the I2C bus 342. Fuel gauge 374 also electrically communicates with both terminals of the battery 350. The fuel gauge 374 is configured to monitor a state of charge of the battery 350 and to send an ALERT interrupt signal, via the GPIO interface 376, to the processor 308 when a charge on the battery 350 falls below a predetermined threshold. In some implementations, the fuel gauge 374 can be further configured to cause the cellular modem 300 to send a battery state message to a database server. In further implementations, the fuel gauge 374 can be further configured to cause the processor 308 to, responsive to initiation of charging the battery 350 following the sending of the battery state message, cause the cellular modem 300 to send a battery charging acknowledgement message to at least to a database server. The flash memory 320 stores executable instructions for causing the processor 308 to, responsive to receipt of the ALERT interrupt signal from the fuel gauge 374, retrieve an encoded voice signal stored in the flash memory 320, the stored voice signal corresponding to a verbal alert for the user to charge the battery 350, and route that stored encoded voice signal to the audio CODEC 312, which then decodes the voice signal and sends the decoded signal to the speaker 330, which broadcasts the verbal alert to the user. FIG. 3A shows that the battery 350 is provided with a protection circuit module (PCM) 378, which can be part of a battery module, and which is configured to prevent the battery 350 from over-charging or over-discharging. Also shown in communication with the fuel gauge 374 is a current sensing resistor 380, which is configured to monitor electrical current through the fuel gauge and to convert that amount of current into a measurable voltage.

Figure 3B:
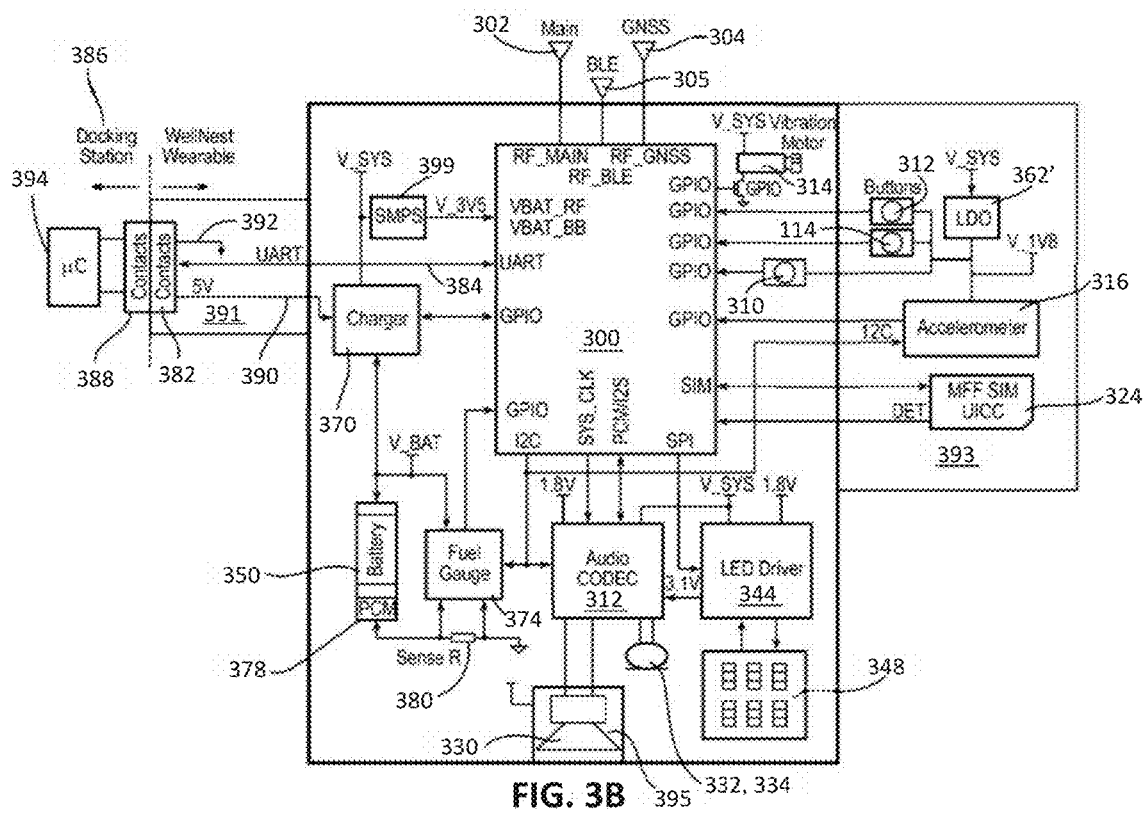
FIG. 3B is a schematic block diagram of exemplary interconnected hardware components of a wearable wireless communication device according to another aspect of the present disclosure.

Still referring to FIG. 3A, the device 100 is shown including a data output interface 382 communicating with the cellular modem 300 via an interface that can be a Universal Asynchronous Receiver/Transmitter (UART) 384, which is configured to transmit data between the processor 308 and the docking station 386. The data output interface 382 can be a series of apertures, or receptacles, that receive a corresponding number of pins from a data input interface 388 of a docking station 386. The terms "input" and "output" used with regard to interfaces 382 and 388 reflects that in various implementations of the present disclosure, there is no requirement for a docking station 386 to return any data to the device 100, but some type of simple acknowledgement message can be included in the protocol. The device 100 detects that it has been docked by sensing a voltage supply input 390 (such as a 5V supply) from the docking station 386 to the battery charger 370. Once docked, the device 100 communicates with the docking station 386 over the UART interface 384. The device 100 can deliver information from, for example, a database server to the docking station 386 for display. This information can comprise localized strings representing a predetermined number of lines (e.g., four lines) of text to be displayed on the docking display screen. In some implementations, the lines of text can comprise the expressions: "You have X new messages" (with X denoting a plurality of messages stored since a prior docking of the device 100). In various implementations, there is no requirement for the docking station 386 to return any data to the device 100, but a simple acknowledgement message can be included in the protocol. A message will only be sent to the docking station 386 when the value for any of the foregoing quoted data items changes since the last time the device 100 was docked. Also, as symbolically represented by arrow 392, once the device 100 is docked in the docking station 386, the interface 382 sends a signal to the processor 308 that the device 100 is in a charged state (now on AC power). This may cause the cellular modem 300 to connect to a remote cloud computing server and determine whether it needs to perform any firmware update. Since the cellular modem 300 will only perform firmware updates when such AC power is detected, battery power is not consumed by performing any firmware updates. Finally, FIG. 3A schematically shows a microprocessor 394 of the docking station 386. FIG. 3B is a schematic block diagram of exemplary interconnected hardware components of a wearable wireless communication device according to another aspect of the present disclosure. This figure shows many of the same components illustrated in FIG. 3A, but shows some of those components mounted on flexible areas 391,393,395 to minimize space taken up by hardware elements within the confines of a housing for a wearable wireless communication device such as device 100. FIG. 3B additionally shows the two side buttons 112,114 discussed above with regard to FIGS. 1A and 1B. Also, newly-shown in FIG. 3B is a switched-mode power supply (SMPS) 399. The function of the SMPS 399 is to reduce the AC-powered voltage of 5V present during docking to a reduced voltage more appropriate for the cellular modem. For instance, with the particular Sierra Wireless modem exemplified above, an input voltage of 3.5V is recommended. Therefore, the SMPS 399 can reduce the AC-powered 5V to the more appropriate 3.5V.

Figure 4A:
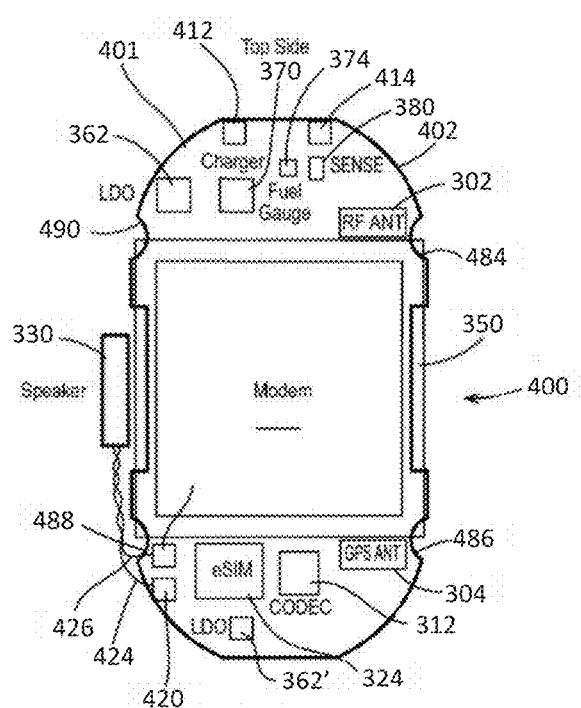
FIGS. 4A and 4B are top and bottom views, respectively, of a printed circuit board for a wearable wireless communication device constructed according to an aspect of the present disclosure, showing placement of various hardware components.
Figure 4B:
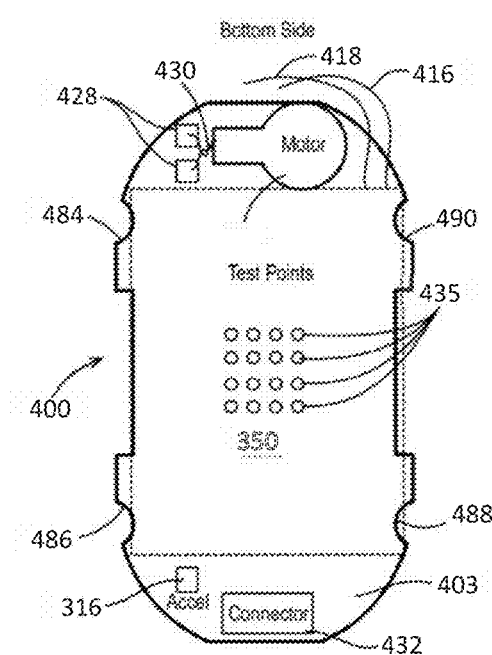

FIGS. 4A and 4B are top and bottom views, respectively, of a printed circuit board (PCB) 400 for a wearable wireless communication device constructed according to an aspect of the present disclosure, showing placement of various hardware components, the reference numbering of which corresponds to components discussed above with regard to FIG. 3. Referring to FIG. 4A, top surface 401 of the PCB 400 supports, among other elements herein mentioned, and zones for positioning or placements of the main cellular antenna 402 and the GNSS antenna 404. In some implementations, the physical placements of main cellular antenna 402 and the GNSS antenna 404 may be at, within, about the vicinity or above the surface zones of the PCB at the locations depicted in FIG. 4A, preferably in one or more non-conductive zones. In some implementations, the cellular antenna 402 zone is approximately, but is not limited to, 200 square millimeters. In other implementations, the GPS antenna 404 zone is approximately, but not limited to 41 square millimeters. To minimize interference of signal reception by cellular antenna 402 and GNSS antenna 404, the outer edge of cellular antenna 402 of the PCB 400 is shaped to define indentations 484,486,488,490. Top surface 401 supports battery contacts 412,414 that correspond with, and respectively contact when assembled, power and ground wires 416,418 from the battery 350 (FIGS. 3A and 3B). Top surface 401 similarly supports speaker contacts 420,422 that correspond with, and respectively contact when assembled, power and ground wires 424,426 from the speaker 330 of FIG. 3A. The remaining elements supported by top surface 401 include the LDO regulator 362, the charger 412, the fuel gauge 374, the current sense resistor 380, the audio CODEC 312, another LDO regulator 362', and the SIM card 324.

Referring to FIG. 4B, the bottom surface 403 of the PCB 400 supports a pair of motor contacts 428, each contact in the pair 428 being contacted by one of a ground and power wire in the pair of motor power wires 430 connected to the vibration motor 314. Bottom surface 403 of the PCB 400 also supports the accelerometer 316. Finally, a connector region 432 is formed into the bottom surface 403 to define a region for an electrical connection to the battery 350.

Figure 5A:
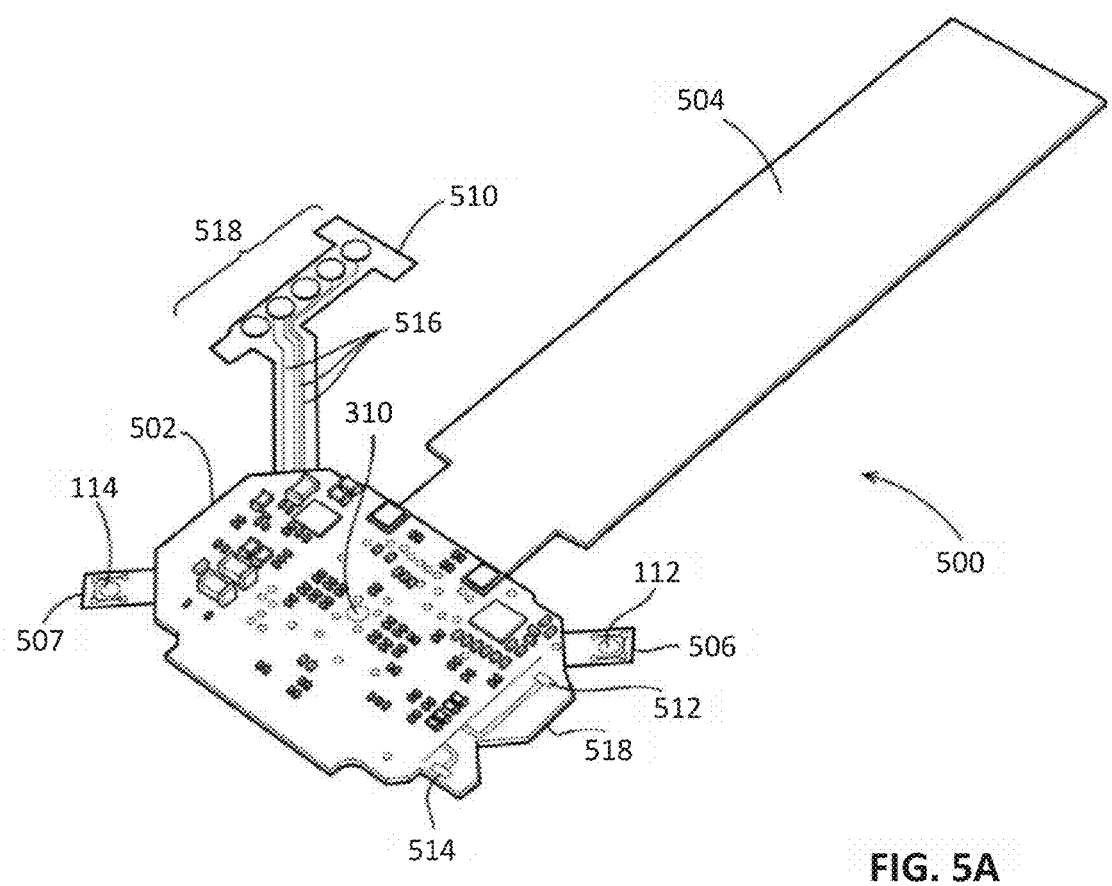
FIGS. 5A and 5B are perspective and bottom views, respectively, of a printed circuit board and ground plane extension element of a wearable wireless communication device constructed according to another aspect of the present disclosure.
Figure 5B:
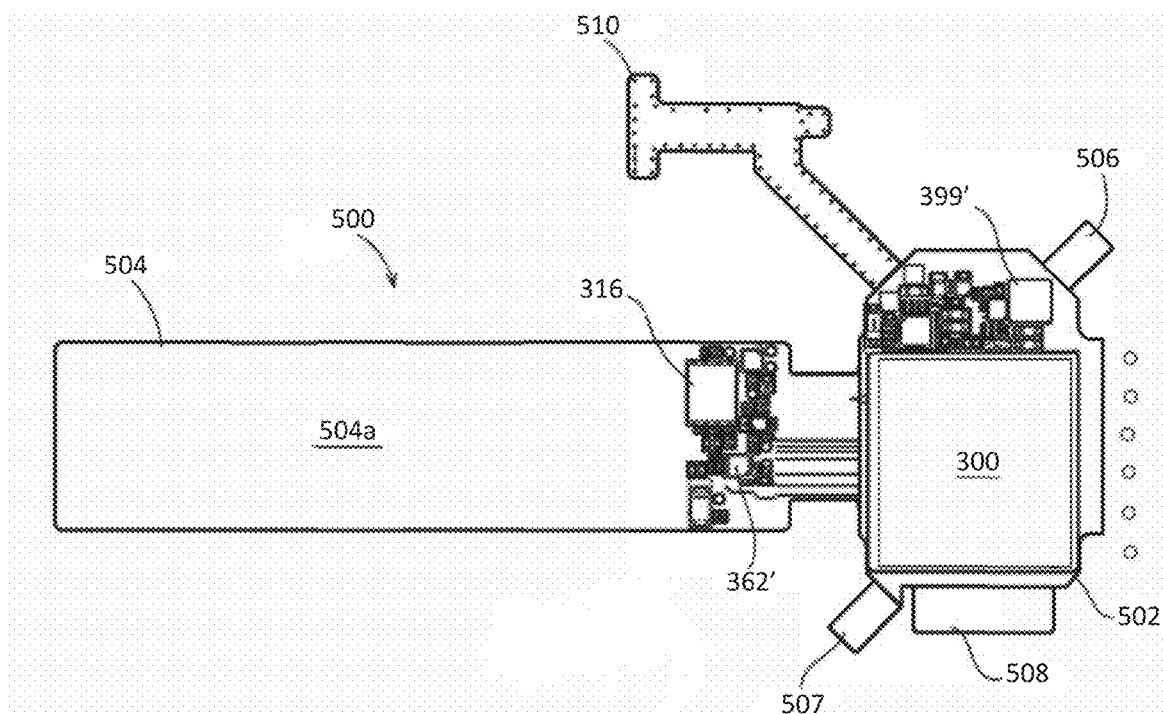

FIGS. 5A and 5B are perspective and bottom views, respectively, of a printed circuit board (PCB) and ground plane extension element of the device 100 in accordance with another embodiment of the present disclosure. Like FIG. 3, FIGS. 5A and 5B illustrate FPCB members supporting certain hardware components. FIGS. 5A and 5B disclose a circuit assembly 500 comprising a PCB 502, on which are mounted a plurality of hardware components, including but not limited to the primary upper button 310 located substantially centrally on PCB 502, together with a plurality of flexible members 504,506,508,510 joined to respective edges of PCB 502 by any suitable means. In some implementations, the dimensions of PCB 502 are approximately, but not limited to, 35 millimeters by 29 millimeters by 0.80 millimeters thick. Flexible members 506,508,510 can each be constructed of a flexible material such as a polyimide. Flexible member 504 is a ground plane extension for the main RF antenna 302 and the GNSS antenna 304 (FIG. 3A). Ground plane extension 504 comprises a conductor and in some implementations can be constructed of any conductive material, including but not limited to copper, aluminum, brass, and steel. In other implementations, ground plane extension 504 can comprise a combination of a conductive layer and a dielectric layer. The conductive layer in such implementations can be comprised of the aforementioned conductive materials. In some implementations, the ground plane extension 504 is approximately, but not limited to, 8 millimeters by 83 millimeters by 0.28 millimeters thick. In an implementation, the total length of the ground plane of PCB 502 and ground plane extension 504 is greater than 110 millimeters, to enable multi-band operation for device 100. The surface of PCB 502 is populated with electrical connectors, preferably but not limited to Pogo pins, to keep the device 100 compact, small, and low profile in design. In some implementations, the Pogo pins enables one or more cellular and GPS antennas to be connected to the ground plane of PCB 502 and subsequently to the ground plane extension 504. The suitable performances (e.g., frequency responses) of one or more cellular antenna in the low band (LB: 698-894 MHz) and high band (HB: 1700-2200 MHz) are achieved by conductively coupling to the ground plane of PCB 502 and conductive ground plane extension 504. In a similar manner, the bandwidth (BW) of the GPS antenna is also expanded, for operation at 1575 MHz as well as additional satellite position data (e.g., GLONASS signals at 1609 MHz), by coupling to the ground plane of PCB 502 and the ground plane extension 504. The ground plane extension 504 is encapsulated in the wristband strap 106 (FIGS. 1A and 1B) of the device 100. The strap 106 can be injection molded to create a flexible strap with two halves. The extension 504 can be sandwiched or inserted between the two halves and then either snap (press) fit into the halves or glued into place with an adhesive. Flexible member 506 supports the first side button 112, while flexible member 507 supports the second side button 114. Flexible member 508 supports two test points 512,514 for the speaker 330 (FIG. 3), one for a negative input of the speaker 330, and another for a positive input of the speaker 330. Test points 512,514 are supported by the flexible member 508 so that they can be bent to a side of the device 100 to have close proximity to the inputs of the speaker 330. Flexible member 510 supports elongated via 516 that electrically interconnect PCB 502 to a series of five electrical contact pads 518. Referring to the bottom view of FIG. 5B, the ground plane extension 504 has a bottom surface 504a. The underside of PCB 502 supports an inductor 399' of the SMPS 399 (FIG. 3B). Also, the underside of the PCB 502 can support the cellular modem 300.

In general, several factors interfere with the operations of the antennas (i.e., cellular, GPS) of wearable wireless communication devices. For example, the body of the user degrades operation of antennas in wearable wireless devices that are in contact with and/or in proximity to the body of the user. This is due to absorption loss and/or poor impedance matching of the antennas to the circuits of the device. The poor impedance matching may result in higher signal losses and/or reduced efficiency of the antennas and/or radiation structure. It has been discovered that placement and or shielding of antennas from other electronic components are required to achieve the performances of the present invention. Wearable wireless communication devices may perform better when apart from the close proximity of the user. Therefore, the mechanical design and placements of the components of the device 100 is important to the functional operations of the antennas. It also has been discovered that the power requirement can be minimized and battery life extended by the mechanical, electrical, and antenna designs of the apparatus.

FIGS. 6A and 6B are illustrations of particular mechanical designs of device 100 and housing 102 including the ground plane extension 504. FIG. 6A is a side view illustration of housing 102 comprising a non-conductive clamshell-like design with a top half housing frame 602 and corresponding bottom half housing frame 604. In some implementations, the thickness of housing 102, from the top surface of housing frame 602 to the bottom surface of housing frame 604, is preferably, but not limited to, not greater than 20 millimeters, to keep the device compact and small. Referring to FIG. 6B, a cross-section B-B of device 101, the top half housing frame 602 comprises an internal upper wall surface area 606 for placement of antennas 302,304 (FIG. 3A). In one implementation, the traces of antenna 302,304 are printed on the wall surface area 602 using a Laser Direct Structuring (LDS) process. In another implementation, the traces of antenna 302,304 are integrated on or within the wall surface area 602 using a LDS process. In some implementations, when the said housing frames are assembled together, the antennas 302,304 are positioned at, within, about the vicinity, or above the surface of their said corresponding zones of cellular antenna 402 and GNSS antenna 404 (FIG. 4). In an embodiment, the antennas, positioned at said zones, are isolated from PCB 502 with a non-conductive (e.g., plastic) shielding element 608. In some implementations, the materials and dimensions (thickness and area) of the shielding element 608 are selected to effectively shield the operations of the antennas from interferences caused by one or more electronic components populated on the surface of PCB 502 and or said flexible members. However, electrical connections can be made to the electrical components populated on PCB 502 through connector ports 610 and 612. In a preferred embodiment, connector port 610 enables one or more cellular antenna to make electric connections to components of PCB 502 through said electrical connector 610. In a similar manner, connector port 612 enables one or more GPS antenna to make electric connections to components of PCB 502.

Figures 7A, 7B:
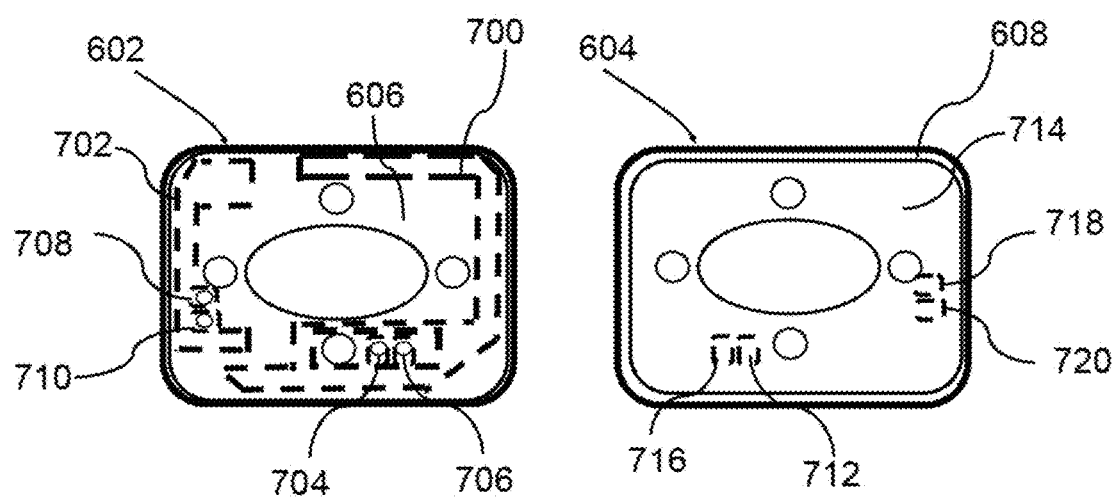
FIG. 7A is an illustration of a top housing frame of the wearable wireless communication device and placements of Laser Directed Structuring (LDS) three-dimensional antenna trace conductive elements within an inner wall surface according to an aspect of the present disclosure.
FIG. 7B is an illustration of a top view of a bottom housing frame of a wearable wireless communication device enclosing a shielding element having trace conductive elements for electrical connections to LDS constructed antennas according to an aspect of the present disclosure.

FIGS. 7A and 7B are an illustration of housing 102, separated as clamshell-like, with a three-dimensional (3D) top housing frame 602 (FIG. 7A) and a corresponding three-dimensional bottom housing frame 604 (FIG. 7B), according to an aspect of the present disclosure. Referring to FIG. 7A, the top housing frame 602 is shown with an inner wall 606 containing several trace conductive elements. The trace conductive elements represent preferable placement of the physical antennas 302, 304 (FIG. 3). In some implementations, the trace conductive elements are placed on the x-y plane of inner wall surface 606. In other implementations, the trace conductive elements are placed on the z-plane surfaces of inner wall 606. In various implementations, the trace conductive elements are placed on the surfaces of one or more emanating protrusions of inner wall 606 in the z-direction. In an embodiment, element 700 is the trace conductive patterns of cellular antenna 302, preferably a LTE antenna, capable of operating in said frequencies, and 702 is the trace conductive patterns of GPS antenna 304, capable of operating in said frequencies. The conductive patterns of element 700 are preferably placed with a feed arm pad 704 and ground arm pad 706 in proximity to each other and the conductive patterns may be connected to create multiple resonances to achieve the device performance for the said LTE bands, LB and HB. Similarly, conductive element 702 has a feed arm pad 708 and ground arm pad 710 and one or more separate traces running parallel and connected to broaden the GPS antenna's operational bandwidth. Referring to FIG. 7B, shielding element 608 (FIG. 6B) is shown residing within the bottom housing frame 604. Shielding element 608 comprises several trace conductive elements for making electrical connections with the antenna trace conductive elements (via feed and ground arm pads) positioned with inner surface 606 of top housing frame 602, enabling subsequent connections to cellular modem 300 (FIG. 3A). In some implementations, the electrical connections are made when the feed arm of element 700 is connected to the LTE antenna Radio Frequency (RF) electronic circuits via the mirror mating of feed arm pad 704 with feed pin 712 located on the surface 714 of shielding element 608 (FIG. 68B). Similarly, the ground arm of element 700 is connected to the ground plane of said PCB 502 (FIG. 5) via the mirror mating of ground arm pad 706 with ground pin 716 located on the surface 714 of plastic shielding element 608. The feed arm of element 702 is connected to the GPS antenna Radio Frequency (RF) electronic circuits via mirror mating of feed arm pad 708 with feed pin 718 located on the surface 714 of plastic shielding element 608. The ground arm of element 702 is connected to the ground plane of said PCB 502 (FIG. 5) via the mirror mating of ground arm pad 710 with ground pin 720 located on the surface 714 of plastic shielding element 608. Mirror mating is accomplished when top housing frame 602 and bottom housing frame 604 are co-aligned and sandwiched and or assembled together to form housing 102 of device 100. In some implementations, connections through feed pins, 712, 716, 718, 720 are made using said Pogo pins. In some implementations, the feed arm and or ground arm pads are located on one or more surfaces of one or more emanating protrusions of inner wall 606 in the z-direction, such protrusions enable intimate electrical contacts with feed and ground pins located on surface 714 of plastic shielding element 608, when device 100 is fully assembled.

In some implementations, the trace conductive patterns for the antennas are printed on or integrated into the inner wall surface 606 with a laser direct structuring (LDS) process in which conductive material is disposed at laser-defined locations. In a preferred embodiment, the resulting conductive patterns of element 700 is a 3-dimensional (3D) Planar-Inverted F antenna (PIFA). In another preferred embodiment, the resulting conductive patterns of element 702 is a 3-dimensional loop antenna. The conductive antenna patterns are preferably, but not limited to, 15 to 20 micrometers thick. In some implementations, the use of these two antennas preferably limits the operational interferences between themselves. The overall dimension for GPS loop antenna is preferably, but not limited to, 250 square millimeters. The antenna patterns may be printed, incorporated, or integrated on or within one or more internal surfaces (e.g., x,y,z) or embedded within one or more surfaces of top housing frame of 602. In an alternative embodiment, the antenna patterns may be formed for any suitable equivalent antenna types. For example, antennas may include antennas with resonating elements that are formed from loop antenna structures, patch antenna structures, other inverted-F antenna structures, slot antenna structures, planar inverted-F antenna structures, helical antenna structures, hybrids of these designs, etc. If desired, one or more of antennas may be cavity-backed antennas formed by placing slot antennas, monopole antennas, and other resonating element structures. Different types of antennas may be used for different bands and combinations of bands for wireless communication.

The said wireless communication may include a cellular communication that uses at least one of long-term evolution (LTE), LTE advanced (LTE-A), code division multiple access (CDMA), wideband CDMA (WCDMA), universal mobile telecommunication system (UMTS), wireless broadband (WiBro), and global system for mobile communication (GSM). The wireless communication may include at least one of wireless fidelity (Wi-Fi®), Bluetooth®, Bluetooth® LE, Bluetooth® Low Energy (BLE), ZigBee™, near field communication (NFC), magnetic secured transmission, radio frequency (RF), LAN, WAN, or body area network (BAN). The wireless communication may include a global positioning system (GPS), global navigation satellite system (GNSS), Beidou navigation satellite system (Beidou), Galileo, and the European global satellite-based navigation system. Herein, "GPS" may be interchangeably referred to as "GNSS." Additional bands and equivalent terminologies include Third Generation (3G), Fourth Generation (4G), Fifth Generation (5G), future generations, and the like. The wireless transceivers and cellular modems may be configured to communicate according to an IEEE 802.11 standard, cellular (e.g., 2G, 3G/4G/LITE/5G) standard, a GPS standard, or other standards. In addition, such a wireless communication can be implemented in accordance with one or more radio technology protocols, for example, such as NFC, 3GPP LTE, LTE-A, 3G, 4G, 5G, WiMax, Wi-Fi, Bluetooth, ZigBee, IoT, or the like.

The LDS process according to an embodiment of the present disclosure means a laser direct patterning method which can form a conductive pattern by using an electro-less plating after directly patterning a circuit on a plastic molded product (e.g., top housing frame 602, FIG. 6A). The LDS process may have an advantage that a conducting pattern of various 3D shapes may be implemented by directly patterning the circuit on a plastic product by using a laser. During the LDS process, a metal organic compound contained within the inner wall surface 606 (FIGS. 6B and 7A) of top housing frame 602 is formed as a plating seed by a laser reaction. The energy of a laser decomposes a chemical coupling of the metal organic compound of the top housing frame 602 by a photochemical reaction, and a metallic element is formed only in a laser-patterned portion to thus serve as a plating seed at the time of electro-less plating. In addition, the inner wall surface 606 of the top housing frame 602 which has undergone a laser ablation process has a strong mechanical coupling between a plating layer and the top housing frame 602.

According to another embodiment of the present disclosure, the top housing frame 602 is molded by using a Laser Direct Structuring (LDS) material. The housing frame 602 may be formed of an LDS material or alternatively, housing frame 602 may be molded by dispersing an LDS material. That is, housing frame 602 may be formed by using only an LDS material, or may be formed by combining another resin such as polycarbonate (PC) resin with an LDS material.

That is, housing frame 602, according to an embodiment of the present invention, may be sufficiently formed if it contains an LDS material. In some implementations, the housing frame 602 is formed by mixing or dispersing an LDS material with or in a PC resin, or a blend of PC and acrylonitrile-butadiene-styrene (ABS). In other implementations, housing frame 602 serves as an LDS substrate containing a blend of PC and PC-ABS for internal or external antenna fabrication. In some embodiments, the present invention incorporates the use of Matching Networks (MNs), to achieve robust multi-band operation, maximize power transfer to antennas, and minimize standing wave ratio, within a wearable wireless communication device.

Figure 8:
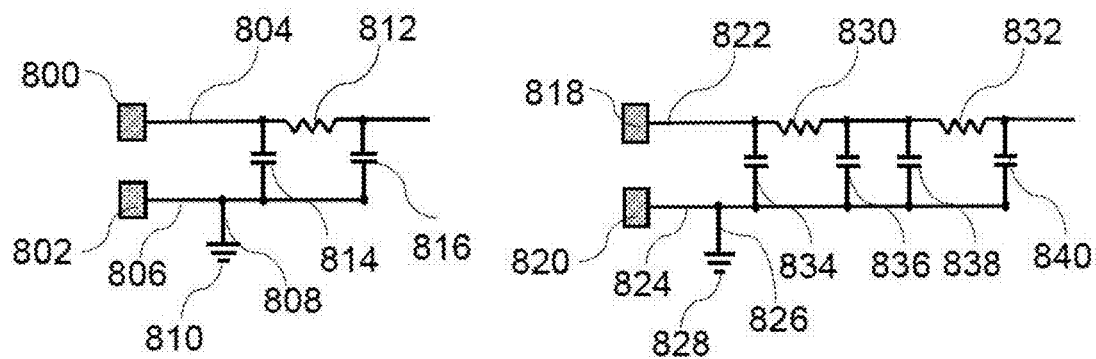
FIG. 8 is a schematic diagram of exemplary Matching Networks for the antennas according to an aspect of the present disclosure.

FIG. 8 illustrates schematics for the MNs that may be incorporated to operate in conjunction with a GPS and or cellular antennas described herein. In some embodiments, the matching network for the GNSS antenna described herein is a single Pi network comprising antenna feed contact 800, antenna ground contact 802, feed conductive connection 804, conductive connection 806, ground conductive connection 808, ground element 810, resistive element 812, and capacitive elements 814, 816. In some implementations, the values of elements 812, 814, and 816 are determined by the resistance and or capacitance measurements of one or more antenna 302, 304, mechanical assembly, and PCB 502 described herein. In some implementations, the capacitance of the combination of one or more said elements are in the range of 1 to 50 pico-Farad. The series elements of the network may also comprise inductors, preferably, but not limited to, 1 to 20 nano-Henry, or capacitors, preferably, but not limited to 20 pico-Farad (50 V, 5%). In a preferred embodiment, all RF traces are routed as 50 Ohms. Similarly, in some implementations, the matching network for the cellular antenna described herein is a double Pi network. The network comprises antenna feed contact 818, antenna ground contact 820, feed conductive connection 822, conductive connection 824, ground conductive connection 826, ground element 828, resistive elements 830, 832 and capacitive elements 834, 836, 838, and 840. In some implementations, the values of one or more resistors, capacitors are determined in a similar manner as for the said Pi network. In some implementations, the capacitance of the combination of one or more said elements are in the range of 1 to 50 pico-Farad. The series elements of the network may also comprise inductors, preferably, but not limited to, 1 to 20 nano-Henry, or capacitors, preferably, but not limited to 20 pico-Farad (50 V, 5%). In a preferred embodiment, all RF traces are routed as 50 Ohms. In alternative implementations, other MNs (e.g., T-type) may be incorporated into the device of the present invention, preferably with the goal to maximize power transfer to one or more antennas described herein and minimize the standing wave ratio.

Figure 9:
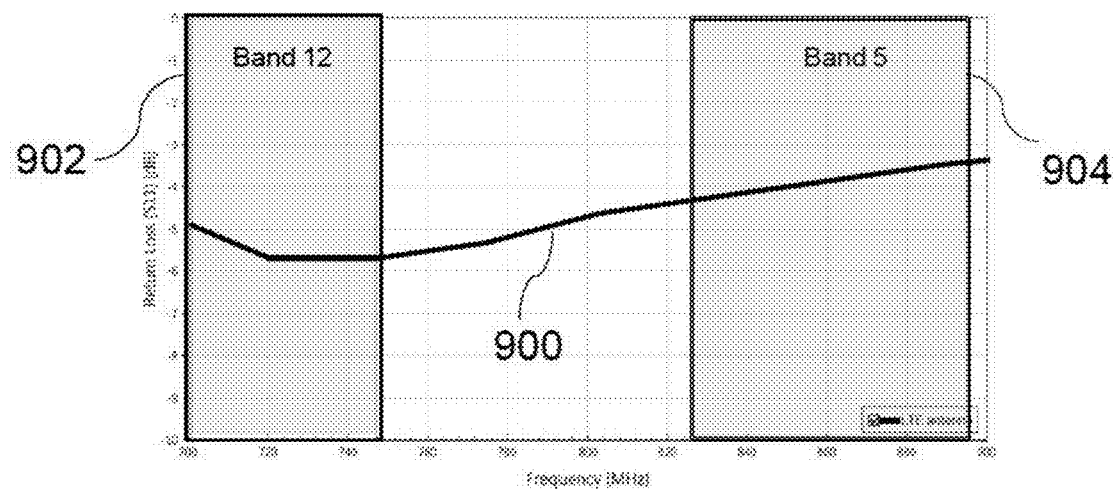
FIG. 9 is a diagram of the measured return loss of the cellular antenna for operation in the low frequency bands according to an aspect of the present disclosure.

The characteristics of the antennas of the present invention were modeled, measured, evaluated and the performances are disclosed as follow. FIG. 9 is a diagram of the measured return loss of the cellular antenna described herein for operation in the low frequency bands according to an aspect of the present disclosure. Measurements were performed on a phantom hand model inside a Satimo chamber. The return loss [dB] 900 for the antenna is above −6 dB (within VSWR of 3) from 700 to 900 MHz thus demonstrating effective low frequency operation for Band 12 902 and Band 5 904 which is practicable for LTE mobile applications.

Figure 10:
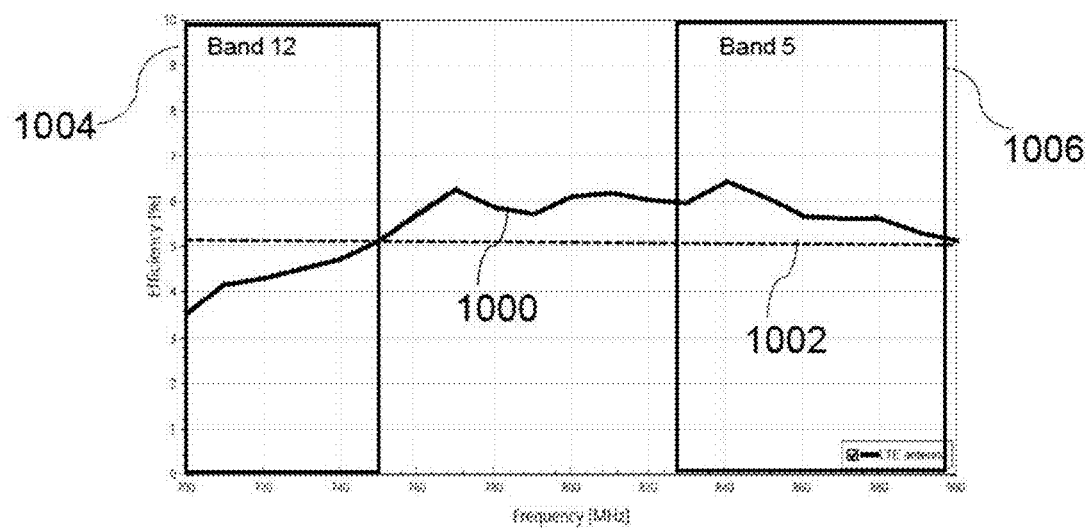
FIG. 10 is a diagram of the measured efficiency of the cellular antenna for operation in the low frequency bands according to an aspect of the present disclosure.

FIG. 10 is a diagram of the measured efficiency of the cellular antenna described herein for operation in the low frequency bands according to an aspect of the present disclosure. The efficiency (%) 1000 for the antenna is within the 5% 1002 for Band 12 1004 and Band 5 1006. In a preferred embodiment, the efficiency for Band 5 1006 and Band 12 1004 are at or above 5%. In a preferred embodiment, the antenna 302 possesses a minimum Total Radiated Power (TRP) of 10.0 dBm and a minimum Total Isotropic Sensitivity (TIS) of −83 dBm/5 MHz for Band 12 1004. In another embodiment, the antenna possesses a minimum TRP of 10.0 dBm and minimum TIS of −81.0 dBm/10 MHz for Band 5 1006.

Figure 11:
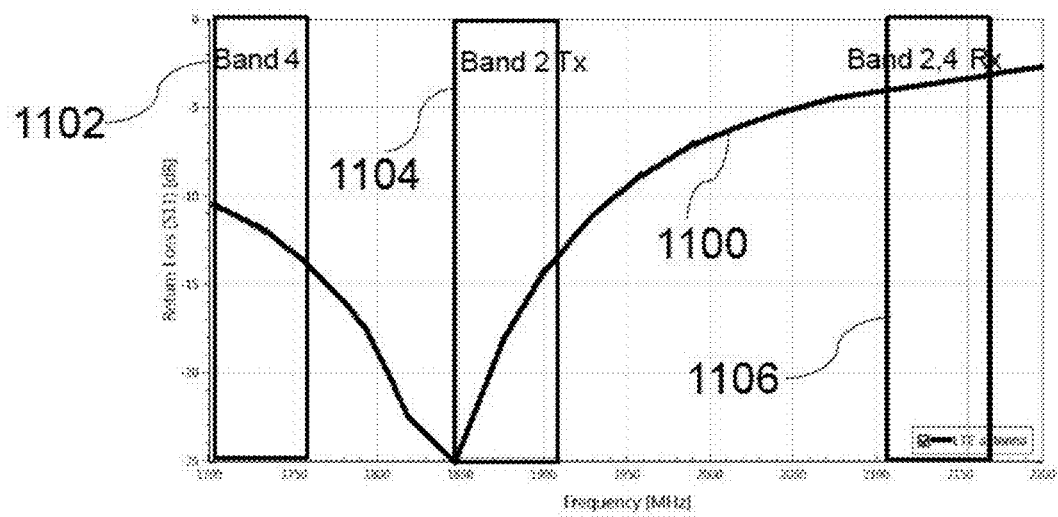
FIG. 11 is a diagram of the measured efficiency of the cellular antenna and a diagram of the measured return loss of the cellular antenna for operation in the high frequency bands according to an aspect of the present disclosure.

FIG. 11 is a diagram of the measured return loss of the cellular antenna described herein for operation in the high frequency bands according an aspect of the present disclosure. The antenna demonstrates operational return loss [dB] 1100 for transmission (Tx) Band 4 1102 and Band 2 1104 as well as Receiver (Rx) Bands 2 and 4 1106 which are practicable for LTE mobile applications.

Figure 12:
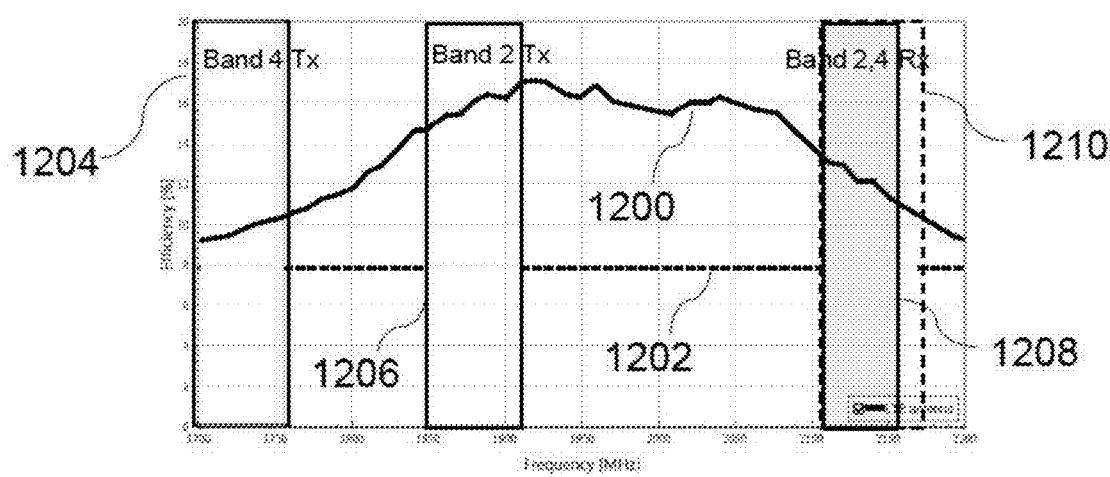
FIG. 12 is a diagram of the measured efficiency of the cellular antenna for operation in the high frequency bands according to an aspect of the present disclosure.

FIG. 12 is a diagram of the measured efficiency of the cellular antenna described herein for operation in the high frequency bands according to an aspect of the present disclosure. The efficiency (%) 1200 for the cellular antenna is above the 8% 1202 for transmission (Tx) Band 4 1204, and Band 2 Tx 1206 as well as Reception (Rx) Band 2 1208 and Band Rx 4 1210. In a preferred embodiment, the antenna efficiency for operation within said bands should be at least 8%, more preferably higher than 8%, most preferably higher than 10%. In yet another preferred embodiment, the antenna possesses a minimum TRP of 12.0 dBm and a minimum TIS of −83 dBm/5 MHz for Band 4 1204. In another embodiment, the antenna possesses a minimum TRP of 12.0 dBm and minimum TIS of −83.0 dBm/10 MHz for Band 2 1206.

Figure 13:
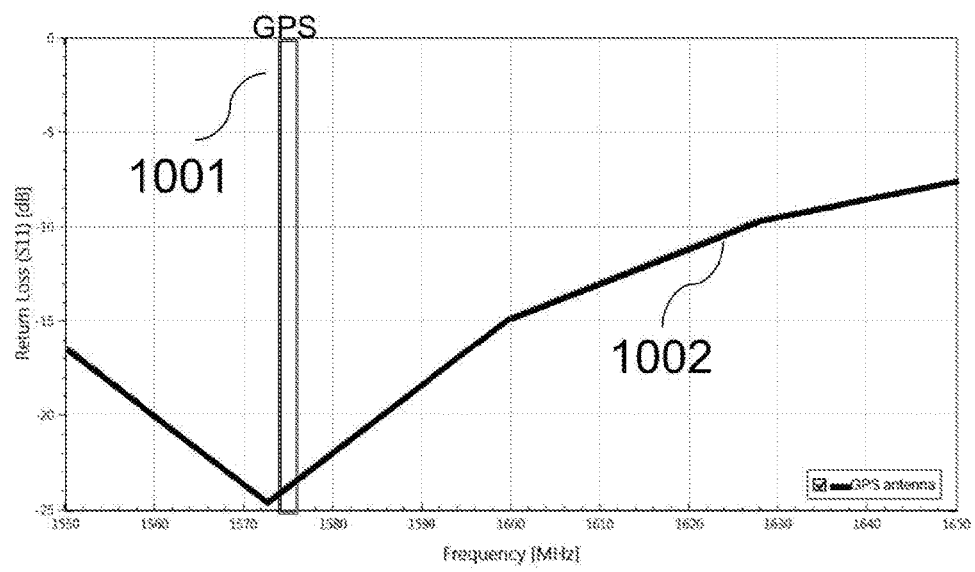
FIG. 13 is a diagram of the measured return loss of the GPS antenna according to an aspect of the present disclosure.

FIG. 13 is a diagram of the measured return loss of the GPS antenna described herein for operation in the GPS frequency band 1300 according to an aspect of the present disclosure. Measurements were performed on a phantom hand model inside a Satimo chamber. The return loss [dB] 1302 for the antenna demonstrates larger bandwidth operation beyond just the GPS frequency, extending from 1550 MHz to 1650 MHz, which is practicable for location-based applications.

Figure 14:
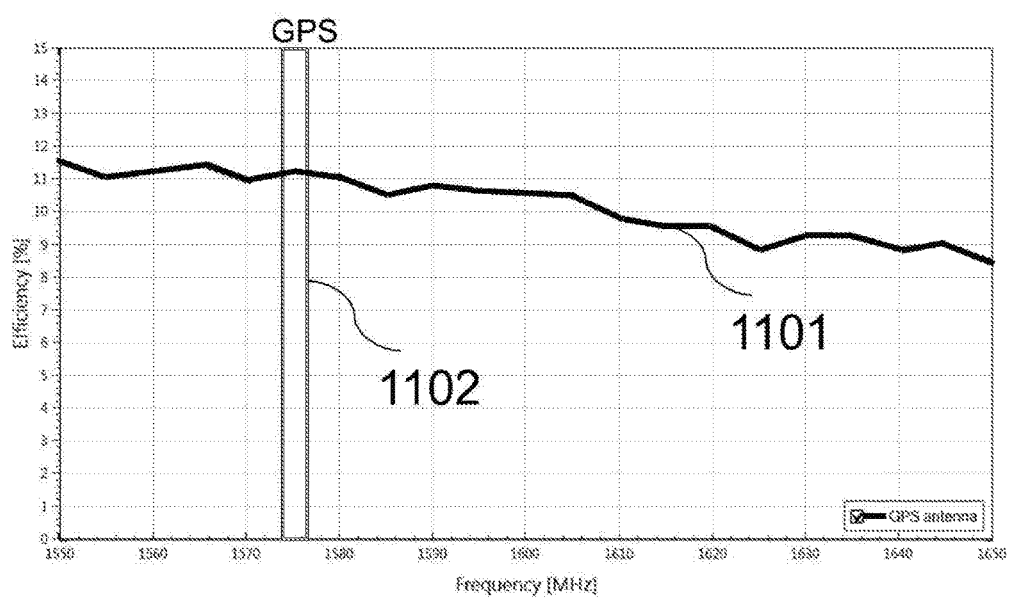
FIG. 14 is a diagram of the measured efficiency of the GPS antenna according to an aspect of the present disclosure.

FIG. 14 is a diagram of the measured efficiency of the GPS antenna described herein for wide-band operation according to an aspect of the present disclosure. The efficiency (%) 1400 for the antenna is above 10% for the GPS frequency band 1402. In a preferred embodiment, the GPS antenna efficiency for wide-band (1550 to 1650 MHz) operation should be at least 8%, more preferably higher than 8%, most preferably higher than 10%.

Figure 15:
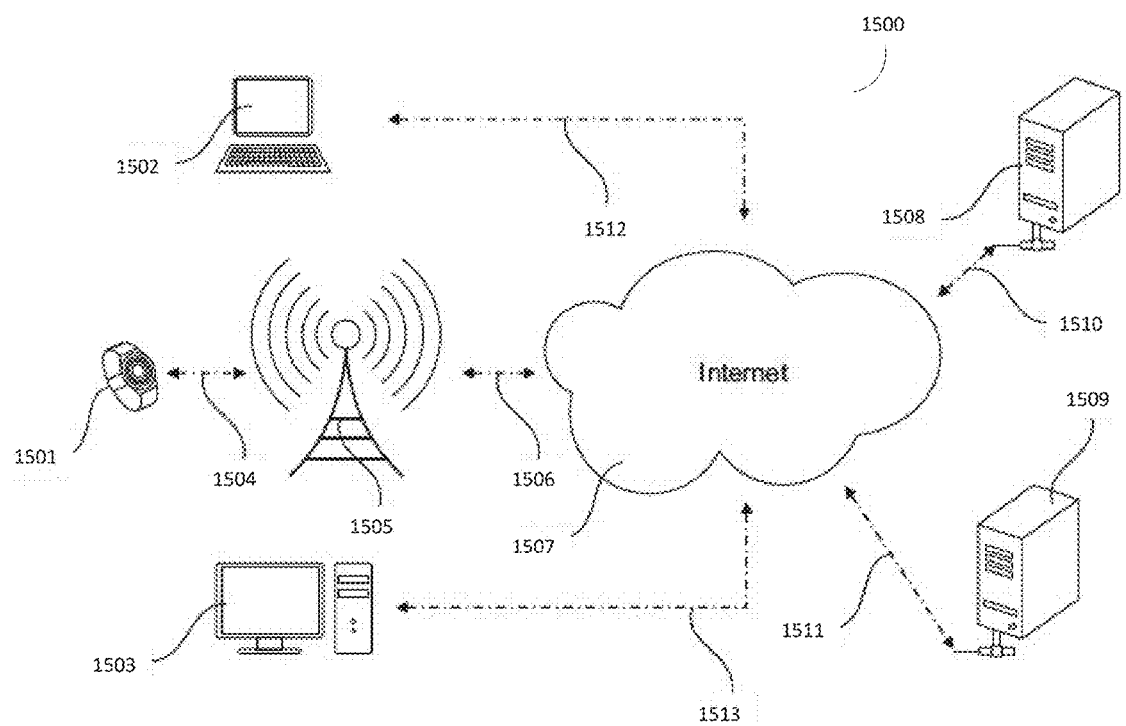
FIG. 15 is an illustration of a system incorporating a wearable device for communication with remote terminals; and, FIG. 16 is an illustration of a relational agent comprising a wearable device with a voice-controlled speech I/O interface and a cloud-based control service.

FIG. 15 illustrates a system 1500 incorporating a wearable device 1501, corresponding to said device 100 of FIG. 1, for a user to interact with one or more remote terminals. One or more user can communicate with a user of the wearable device using for example a portable (e.g., laptop) computing device 1502 or stationary computing device 1503. Device 1501 communicates with the system via communication means 1504 to one or more cellular communication network 1505 which can connect device 1501 via communication means 1506 to the Internet 1507. Device 1501, 1502, and 1503 can access one or more remote servers 1508, 1509 via the Internet 1507 through communication means 1510 and 1511 depending on the server. Device 1502 and 1503 can access one or more servers through communication means 1512 and 1513. In a preferred embodiment, the wearable enables communication or access to one more of the following: another communication device; computing device; communication network; remote server; cloud server; cloud application software. The cloud server and service are commonly referred to as "on-demand computing", "software as a service (SaaS)", "platform computing", "network-accessible platform", "cloud services", "data centers," and the like. In an alternative embodiment, the apparatus communicates with a combination of at least one; communication network; remote server; cloud server; cloud application software. One or more said components are configured to function together to enable a user to interact with a resulting relational agent.

In yet another preferred embodiment, the said wearable device 1501 enables communication with one or more remote servers, for example server 1508, capable of providing cloud-based control service, to perform natural language or speech-based interaction with the user. The wearable device 1501 incorporates, contains, or implements a voice-controlled speech I/O interface that listens and interacts with a user to determine a user intent based on natural language understanding of the user's speech. The interface may comprise hardware, software, or remote accesses services to perform its function. The said wearable device 1501 may be configured to capture user utterances and provide them to the control service located on server 1508. The control service performs speech recognition-response and natural language understanding-processing on the utterances to determine intents expressed by the utterances. In response to an identified intent, the controlled service causes a corresponding action to be performed. An action may be performed at the control service or by instructing the wearable device 1501 to perform a function. The combination of the wearable device 1501 and control service located on remote server 1508 serve as a relational agent. The relational agent provides conversational interactions, utilizing automated voice recognition-response, natural language processing, and the like, to: perform functions, interact with the user, fulfill user requests. Ultimately the said device 101 enables the user to access and interact with the said relational agent.

Figure 16:
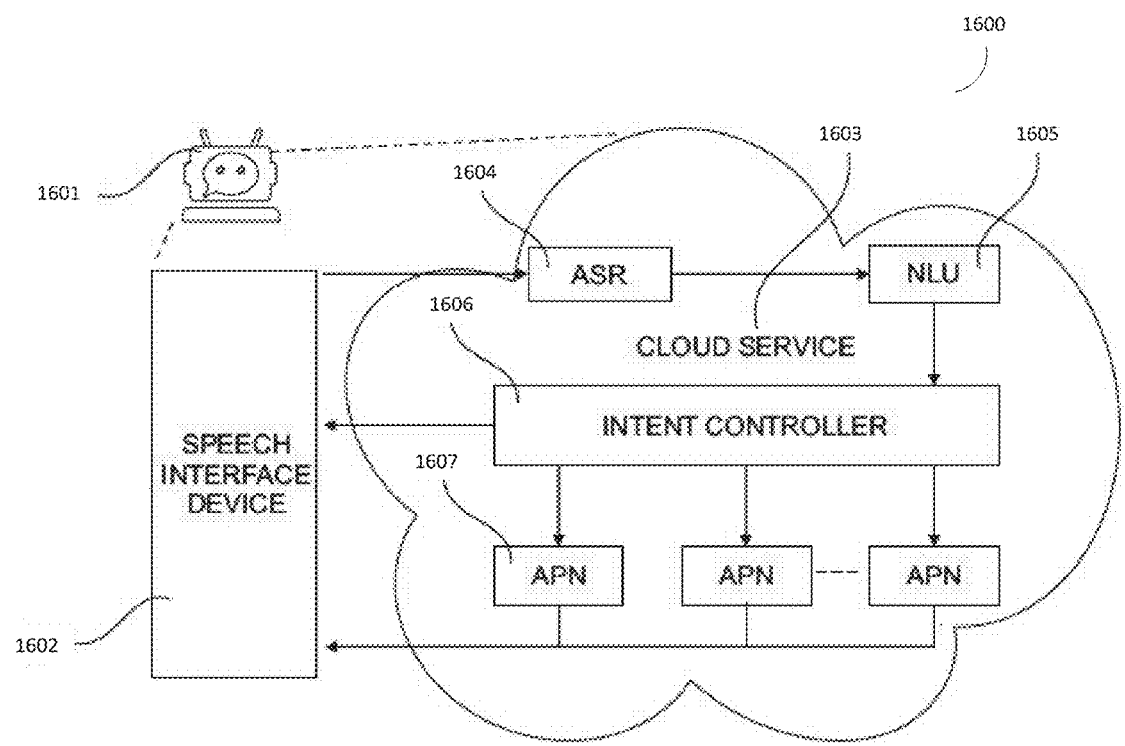

FIG. 16 is an illustration 1500 of a relational agent 1501 comprising a wearable device 1502 with voice-controlled speech I/O interface and a cloud-based control service 1503. A representative cloud-based control service can be implemented through a SaaS model or the like. Model services include, but not limited to, Amazon Web Services, Amazon Lex, Amazon Lambda, and the like, available through Amazon (Seattle, Wash.). Such a service provides access to one or more remote servers containing hardware and software to operate in conjunction with said voice-controlled speech interface device, app, or the like. Without being bound to a specific configuration, said control service may provide speech services implementing an automated speech recognition (ASR) function 704, a natural language understanding (NLU) function 705, an intent router/controller 706, and one or more applications 707 providing commands back to the wearable device 702. The ASR function can recognize human speech in an audio signal transmitted by the wearable device received from a built-in microphone. The NLU function can determine a user intent based on user speech that is recognized by the ASR components. The speech services may also include speech generation functionality that synthesizes speech audio. The control service may also provide a dialog management component configured to coordinate speech dialogs or interactions with the user in conjunction with the speech services. Speech dialogs may be used to determine the user intents using speech prompts. One or more applications can serve as a command interpreter that determines functions or commands corresponding to intents expressed by user speech. In certain instances, commands may correspond to functions that are to be performed by the wearable device and the command interpreter may in those cases provide device commands or instructions to the wearable device for implementing such functions. The command interpreter can implement "built-in" capabilities that are used in conjunction with the wearable device. The control service may be configured to use a library of installable software applications. The control service may interact with other network-based services (e.g., Amazon Lambda) to obtain information, access additional database, application, or services on behalf of the user. A dialog management component is configured to coordinate dialogs or interactions with the user based on speech as recognized by the ASR component and or understood by the NLU component. The control service may also have a text-to-speech component responsive to the dialog management component to generate speech for playback by the wearable device. These components may function based on models or rules, which may include acoustic models, specify grammar, lexicons, phrases, responses, and the like created through various training techniques. The dialog management component may utilize dialog models that specify logic for conducting dialogs with users. A dialog comprises an alternating sequence of natural language statements or utterances by the user and system generated speech or textual responses. The dialog models embody logic for creating responses based on received user statements to prompt the user for more detailed information of the intents or to obtain other information from the user. An application selection component or intent router identifies, selects, and/or invokes installed device applications and/or installed server applications in response to user intents identified by the NLU component. In response to a determined user intent, the intent router can identify one of the installed applications capable of servicing the user intent. The application can be called or invoked to satisfy the user intent or to conduct further dialog with the user to further refine the user intent. Each of the installed applications may have an intent specification that defines the serviceable intent. The control service uses the intent specifications to detect user utterances, expressions, or intents that correspond to the applications. An application intent specification may include NLU models for use by the natural language understanding component. In addition, one or installed applications may contain specified dialog models for that create and coordinate speech interactions with the user. The dialog models may be used by the dialog management component in conjunction with the dialog models to create and coordinate dialogs with the user and to determine user intent either before or during operation of the installed applications. The NLU component and the dialog management component may be configured to use the intent specifications of the applications either to conduct dialogs, to identify expressed intents of users, identify and use the intent specifications of installed applications, in conjunction with the NLU models and dialog modes, to determine when a user has expressed an intent that can be serviced by the application, and to conduct on or more dialogs with the user.

Many different embodiments have been disclosed regarding the above descriptions and the drawings. It will be understood that it would be unduly repetitious to literally describe and illustrate every combination and sub-combination of these embodiments. Accordingly, the present specification, including the drawings, shall be construed to constitute a complete written description of all combinations and sub-combinations of the embodiments described herein, and of the manner and process of making and using them and shall support claims to any such combination or sub-combination. In the drawings and specification, there have been disclosed various embodiments and, although specific terms are employed, they are used in a generic and descriptive sense only and not for purposes of limitation. Therefore, it will be apparent to those skilled in the art that various modifications and variations can be made to the disclosed embodiments without departing from the scope or spirit of the invention. In view of the foregoing, it is intended that the invention covers modifications and variations of this disclosure within the scope of the following claims and their equivalents.

What is claimed is:

1. A wearable antenna system comprising:
    a printed circuit board comprising one or more flexible members coupled to one or more edges of the printed circuit board, and a ground plane disposed on a surface of the printed circuit board;
    a cellular antenna operably engaged with the ground plane;
    a global navigation satellite system antenna operably engaged with the ground plane wherein the global navigation satellite system antenna comprises a trace conductive pattern comprising a three dimensional loop configuration; and,
    a ground plane extension operably engaged with the ground plane and coupled to an edge surface of the printed circuit board, the ground plane extension being operably engaged with the cellular antenna and the global navigation satellite system antenna via the ground plane, the ground plane extension comprising a flexible conductive material having dimensions in the range of about five to 15 millimeters in width, about 50 to 100 millimeters in length, and about 0.2 to 0.5 millimeters in thickness.

2. The wearable antenna system of claim 1 wherein the ground plane extension is coupled to the edge surface of the printed circuit board at a location intermediate to the one or more flexible members.

3. The wearable antenna system of claim 1 wherein the printed circuit board is configured having dimensions in the range of about 20 to 40 millimeters in width, about 20 to 40 millimeters in length, and about 0.5 to 1.0 millimeters in thickness.

4. The wearable antenna system of claim 1 wherein the combined length of the ground plane and the ground plane extension is greater than or equal to 110 millimeters.

5. The wearable antenna system of claim 1 wherein the cellular antenna further comprises a trace conductive pattern comprising a three dimensional planar-inverted F configuration.

6. The wearable antenna system of claim 1 wherein the ground plane extension is comprised of a conductive layer and a dielectric layer.

7. The wearable antenna system of claim 1 further comprising a cellular modem disposed on a surface of the printed circuit board, the cellular modem being operably engaged with the cellular antenna and the global navigation satellite system antenna.

8. A wearable wireless communication device comprising:
- a housing comprising an upper frame and a lower frame, the upper frame and the lower frame being mateably coupled, the upper frame and the lower frame each comprising side walls, an inner surface, and an outer surface, the inner surface of the upper frame and the inner surface of the lower frame defining an interior portion of the housing;
- a flexible strap coupled to the housing, the flexible strap comprising an upper strap portion and a lower strap portion, the upper strap portion and the lower strap portion being coupled together to define the flexible strap;
- a printed circuit board being disposed in the interior portion of the housing, the printed circuit board comprising one or more flexible members coupled to one or more edges of the printed circuit board, and a ground plane disposed on a surface of the printed circuit board;
- a cellular antenna operably engaged with the ground plane, the cellular antenna being disposed on an interior surface of the housing;
- a global navigation satellite system antenna operably engaged with the ground plane, wherein the global navigation satellite system antenna is disposed on an interior surface of the housing and comprises a trace conductive pattern comprising a three dimensional loop configuration; and,
- a ground plane extension operably engaged with the ground plane and coupled to an edge surface of the printed circuit board, the ground plane extension being operably engaged with the cellular antenna and the global navigation satellite system antenna via the ground plane, the ground plane extension comprising a flexible conductive material having dimensions in the range of about five to 15 millimeters in width, about 50 to 100 millimeters in length, and about 0.2 to 0.5 millimeters in thickness, the ground plane extension being encapsulated in the flexible strap between the upper strap portion and the lower strap portion.

9. The wearable wireless communication device of claim 8 wherein the housing is constructed from a non-conductive material.

10. The wearable wireless communication device of claim 8 wherein the cellular antenna is disposed on an upper surface of the interior portion of the housing.

11. The wearable wireless communication device of claim 8 wherein the combined length of the ground plane and the ground plane extension is greater than or equal to 110 millimeters.

12. The wearable wireless communication device of claim 10 wherein the global navigation satellite system antenna is disposed on an upper surface of the interior portion of the housing.

13. The wearable wireless communication device of claim 8 further comprising a feed arm pad and a ground arm pad operably engaged with the cellular antenna or the global navigation satellite system antenna.

14. The wearable wireless communications system of claim 8 wherein the cellular antenna comprises a trace conductive pattern comprising a three dimensional planar-inverted F configuration.

15. A wearable wireless communications system comprising:
- a housing comprising an upper frame and a lower frame, the upper frame and the lower frame being mateably coupled, the upper frame and the lower frame each comprising side walls, an inner surface, and an outer surface, the inner surface of the upper frame and the inner surface of the lower frame defining an interior portion of the housing;
- a flexible strap coupled to the housing, the flexible strap comprising an upper strap portion and a lower strap portion, the upper strap portion and the lower strap portion being coupled together to define the flexible strap;
- a printed circuit board being disposed in the interior portion of the housing, the printed circuit board comprising one or more flexible members coupled to one or more edges of the printed circuit board, and a ground plane disposed on a surface of the printed circuit board;
- a cellular antenna operably engaged with the ground plane, the cellular antenna being disposed on an interior surface of the housing;
- a global navigation satellite system antenna operably engaged with the ground plane, wherein the global navigation satellite system antenna is disposed on an interior surface of the housing and comprises a trace conductive pattern comprising a three dimensional loop configuration;
- a ground plane extension operably engaged with the ground plane and coupled to an edge surface of the printed circuit board, the ground plane extension being operably engaged with the cellular antenna and the global navigation satellite system antenna via the ground plane, the ground plane extension comprising a flexible conductive material having dimensions in the range of about five to 15 millimeters in width, about 50 to 100 millimeters in length, and about 0.2 to 0.5 millimeters in thickness, the ground plane extension being encapsulated in the flexible strap between the upper strap portion and the lower strap portion; and,
- at least one matching network disposed on the printed circuit board and operably engaged with the cellular antenna and the global navigation satellite system antenna.

16. The wearable wireless communications system of claim 15 wherein the at least one matching network is configured as a single Pi network or a double Pi network.

17. The wearable wireless communications system of claim 15 wherein the combined length of the ground plane and the ground plane extension is greater than or equal to 110 millimeters.

18. The wearable wireless communications system of claim 15 further comprising a cellular modem disposed on a surface of the printed circuit board, the cellular modem being operably engaged with the cellular antenna and the global navigation satellite system antenna.

19. The wearable wireless communications system of claim 15 wherein the cellular antenna and the global navigation satellite system antenna comprise resonating elements selected from the group consisting of loop antenna structures, patch antenna structures, inverted-F antenna structures, slot antenna structures, planar inverted-F antenna structures, helical antenna structures, and hybrid antenna structures.

20. The wearable wireless communications system of claim 15 wherein the cellular antenna comprises a trace conductive pattern comprising a three dimensional planar-inverted F configuration.

* * * * *